(12) United States Patent
Kadoya et al.

(10) Patent No.: US 6,984,909 B2
(45) Date of Patent: Jan. 10, 2006

(54) MOTOR

(75) Inventors: Naoyuki Kadoya, Sakai (JP); Yasuhiro Kondo, Hirakata (JP); Masaki Tagome, Hirakata (JP); Satoshi Tamaki, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/488,534

(22) PCT Filed: Mar. 27, 2003

(86) PCT No.: PCT/JP03/03905

§ 371 (c)(1),
(2), (4) Date: Mar. 4, 2004

(87) PCT Pub. No.: WO03/084034

PCT Pub. Date: Oct. 9, 2003

(65) Prior Publication Data
US 2004/0245881 A1    Dec. 9, 2004

(30) Foreign Application Priority Data
Mar. 29, 2002  (JP) .............................. 2002-096447
Nov. 13, 2002  (JP) .............................. 2002-329454

(51) Int. Cl.
H02K 1/00     (2006.01)
(52) U.S. Cl. .................. 310/185; 310/216; 310/254
(58) Field of Classification Search ..............
310/156.56–156.58, 156.38–156.47, 179,
310/184, 198–199
See application file for complete search history.

(56) References Cited

U.S. PATENT DOCUMENTS

| 6,034,460 A | 3/2000 | Tajima et al. |
| 6,044,737 A | 4/2000 | Yao et al. |
| 6,049,153 A | 4/2000 | Nishiyama et al. |
| 6,104,117 A | 8/2000 | Nakamura et al. |
| 6,281,609 B1 * | 8/2001 | Itami et al. ............... 310/68 B |

FOREIGN PATENT DOCUMENTS

| JP | 2-123953 | 5/1990 |
| JP | 3-256505 | 11/1991 |
| JP | 4-101270 | 9/1992 |
| JP | 6-105512 | 4/1994 |
| JP | 7-274421 | 10/1995 |
| JP | 8-009510 | 1/1996 |
| JP | 6-038415 | 2/1996 |
| JP | 8-047793 | 2/1996 |
| JP | 9-093976 | 4/1997 |
| JP | 10-234144 | 9/1998 |

(Continued)

OTHER PUBLICATIONS

English Language Abstract JP2001-309625.

(Continued)

Primary Examiner—Thanh Lam
(74) Attorney, Agent, or Firm—Greenblum & Bernstein, P.L.C.

(57) ABSTRACT

In a permanent magnet-embedded, concentrated winding motor, plurality of stator teeth are divided into, for example, three groups that include a plurality of adjacent stator teeth having coils wound around and that are provided with voltage in phase that are set as one group. Coils are wound in opposite directions around adjacent stator teeth in the same group, while the relation between the angle h of a slot opening between adjacent stator teeth of the same group and the angle H of a slot opening formed between adjacent stator teeth of different groups satisfies h<H≦3h.

42 Claims, 16 Drawing Sheets

FOREIGN PATENT DOCUMENTS

| | | |
|---|---|---|
| JP | 2000-152538 | 5/2000 |
| JP | 2000-156958 | 6/2000 |
| JP | 2000-245085 | 9/2000 |
| JP | 2000-324871 | 11/2000 |
| JP | 2001-204103 | 7/2001 |
| JP | 2001-245460 | 9/2001 |
| JP | 2001-309625 | 11/2001 |
| JP | 2002-044887 | 2/2002 |
| WO | 00/72427 | 11/2000 |

OTHER PUBLICATIONS

English Language Abstract JP 2-123953.
English Language Abstract JP 4-101270.
English Language Abstract JP 2000-156958.
English Language Abstract JP 2000-152538.
English Language Abstract JP 6-038415.
English Language Abstract JP 8-047793.
English Language Abstract JP2000-24585.
English Language Abstract JP 2001-245460.
English Language Abstract JP 9-093976.
English Language Abstract JP 2002-044887.
English Language Abstract JP 7-274421.
English Language Abstract JP 2000-324871.
English Language Abstract JP 8-009510.
English Language Abstract JP 2001-204103.
English Language Abstract JP 3-256505.
Toyota, "Estima Hybrid New Vehicle Manual, Type: AHR10W," Jun. 15, 2001, Japan, pp. 0-9 and 1-31, together with an English language translation of the same.
English Language Abstract JP6-105512.

* cited by examiner

MOTOR

TECHNICAL FIELD

The present invention relates to a motor suitably applied to a vehicle such as a pure electric vehicle (PEV), a hybrid electric vehicle (HEV), and a fuel cell electric vehicle (FCEV), and also to a motor suitably applied to a home electrical appliance, a robot, and the like.

BACKGROUND ART

As motor technology for use in a vehicle and the like as described above, Japanese Patent Laid-Open Publication No. 2000-245085 discloses the use of a concentrated winding, magnet-embedded type motor.

The example disclosed by Japanese Patent Laid-Open Publication No. 2000-245085 will be described in conjunction with FIG. 17. FIG. 17 is a sectional view of a main part of a motor including a concentrated winding stator made of a stator core, a plurality of stator teeth with coils wound therearound, and a magnet-embedded type rotor. The section is a plane orthogonal to the central axis of the rotating shaft of the motor.

As shown in FIG. 17, the stator core 145 includes a plurality of stator teeth 143a, 143b, and 143c, and a stator yoke 144 coupling them. Coils 146a, 146b, and 146c are wound around the stator teeth 143a, 143b, and 143c, respectively and thus the stator 146 is formed. Among the stator teeth 143a, 143b, and 143c, the stator tooth 143a is formed on one side of the stator tooth 143b, the stator tooth 143c is formed on the other side, and thus one group is formed. Groups of such stator teeth 143a, 143b, and 143c are provided in the circumferential direction. The stator teeth 143a each have a coil 146a wound therearound in parallel, the end of the wound coil 146a is connected with a common terminal (not shown), and a single terminating connection line is drawn from the common terminal. The stator teeth 143b each have a coil 146b wound therearound in parallel, and the stator teeth 143c each have a coil 146c wound therearound in parallel. The terminating connection lines for the stator teeth 143a, 143b, and 143c are each connected to another common terminal (not shown).

The rotor 147 has a plurality of permanent magnets 149 embedded at equal intervals in the circumferential direction so that these magnets oppose the inner circumferential surfaces of the stator teeth 143a, 143b, and 143c of the stator 146. The rotor 147 has its outer circumferential surface opposed to the inner circumferential surfaces of the stator teeth 143a, 143b, and 143c of the stator 146 with a very small gap therebetween. The distance between the surfaces 149a of the permanent magnets 149 that oppose the inner circumferential surfaces of the stator teeth 143a, 143b, and 143c and the outer circumferential surface of the rotor 147 is larger toward the central part 149c than at the ends 149b of the permanent magnet 149.

The coils 146a, 146b, and 146c form three phases, or a U phase, a V phase, and a W phase, respectively, and when currents in trapezoidal waveforms for example 120 electrical degrees out of phase between each other are provided to the coils in these phases, and torques generated between the coils 146a, 146b, and 146c in these phases and the rotor 147 are 120 degrees out of phase between each other. The torques in the three phases are combined to form a total torque, and the rotor 147 rotates in a prescribed direction accordingly. More specifically, so-called three phase, full wave-driven rotation around the center O of the rotating shaft is carried out. Therefore, in addition to the magnetic torque resulting from the embedded permanent magnets 149 in the rotor 147, a reluctance torque can also be used, so that a high output (high torque) motor that generates a large torque can be provided.

Meanwhile, when the rotor 147 is driven to rotate, a counter electromotive voltage in a substantial sine wave is generated between a common terminal (not shown) and the U, V, and W phase terminals according to the Flemming's right hand rule. As is well known, the counter electromotive voltages for the phases are 120 electrical degrees out of phase among each other, and the counter electromotive voltages in the different phases are combined to obtain a total counter electromotive voltage.

For environmental concerns and resource conservation, there is a demand for use of less copper coils in vehicle motors in general. In the process of recycling automobiles, motors with copper wires mixed with other motors deteriorate the quality level of recycled iron, and in the field of automobiles, motors with copper-free wires are strongly desired. According to conventional techniques, aluminum wires are used for coils for motors instead of copper wires, or aluminum wires are used for other general commutator coils instead of copper wires as disclosed by Japanese Patent Laid-Open Publication No. 2000-245085. However, examples of actual application of the disclosed methods to automobiles have not been known.

The motor with a large torque including the additional reluctance torque can advantageously have a high torque by employing a concentrated winding motor. On the other hand, waveform distortions are observed in the counter electromotive voltage.

A large waveform distortion in the counter electromotive voltage increases eddy current and thus iron loss, which lowers the efficiency. Eddy current is also generated at the permanent magnets embedded in the rotor, and the permanent magnets generate heat to have increased temperature, and could be demagnetized.

Therefore, it is a first object of the invention to provide a high torque, high efficiency motor in a structure with reduced waveform distortions in the counter electromotive voltage and with reduced eddy current generation.

Meanwhile, if coils for a motor as disclosed by Japanese Patent Laid-Open Publication No. 2000-245085, a typical commutator motor and a brushless motor are simply changed from copper wires to aluminum wires, the conductor loss could be great because the resistivity of the aluminum wire is higher than copper wire by about 60%. Therefore, the efficiency of the motor is lowered. Meanwhile, in order to keep the loss from increasing, the motor size must be increased, and in either way, the method remains to be disadvantageous in terms of energy and resource conservation.

It is a second object of the invention to provide a motor with coils made of aluminum or another metal having resistivity larger than copper instead of copper without increasing the size of the motor and lowering the efficiency while the first object is achieved as well.

DISCLOSURE OF THE INVENTION

In order to achieve the above-described object, a motor according to the invention includes: a stator including a stator core having a plurality of stator teeth, and a stator yoke that connects the plurality of stator teeth, and coils wound around the plurality of stator teeth; and a rotor including a rotor core, and a plurality of permanent magnets embedded in the rotor core, wherein groups made of the plurality of adjacent stator teeth around which the coils are wound around are provided. The coils are provided with voltage in phase, coils are wound in opposite directions around the plurality of adjacent stator teeth in the same group, and voltage in different phases are applied to the adjacent groups.

In this way, since the permanent magnets are embedded in the rotor, a reluctance torque as well as a magnet torque will be used, and a high torque will be generated. Furthermore, the coils for adjacent stator teeth in each group are wound so that they have different polarities from each other, which alleviate deviations in the magnetic field distribution and reduce distortions in the waveform of counter electromotive voltage induced at the coils at the time of driving the motor. Therefore, the iron loss in the stator core and the rotor core are restrained, and eddy current is restrained for the permanent magnets in the rotor core. Since eddy current is reduced, heat generation by the eddy current will be alleviated, and the permanent magnets are prevented from demagnetizing. Therefore, an efficient motor is provided.

In the above-described motor, the stator teeth of the stator are divided into 3n (n: positive integer) groups, each of which has three stator teeth. In this way, adjacent coils in the U, V, and W phases in each group have different polarities, and deviations in the magnetic field distribution are alleviated, so that distortions in the waveform of the voltage between the terminals at the time of driving are reduced. Therefore, the iron loss will be restrained, which improves the motor efficiency.

In the above-described motor, the relation represented by the following expression is satisfied for the angle h of a slot opening formed between adjacent stator teeth in the same group and the angle H of a slot opening formed between adjacent stator teeth belonging to different groups:

$h < H \leq 3h$.

In this way, the magnetic field distribution is homogeneous, so that waveform distortions in the counter electromotive voltage is reduced, eddy current is reduced to reduce the iron loss, and heat generation by the eddy current at the permanent magnets is then reduced. Demagnetization of the magnets is also reduced. Consequently, the motor efficiency will be improved.

Furthermore, in the above-described motor, a central line passing through each of the circumferential centers of the tip ends of stator teeth in each group positioned at both ends of said group adjacent to stator teeth belonging to different groups is deviated in the circumferential direction from a central line passing through each of the circumferential centers of the parallel parts of the stator teeth positioned at both ends in said group. The circumferential ends at said tip ends are not positioned inward in the width-wise direction of the parallel parts in either direction.

In this way, the slots between the stator teeth are formed to be spaces in substantially equal sizes, so that the number of turns at coils wound around the stator teeth increases, and the generation torque is increased according to the increase in the number of turns. Meanwhile, adjacent coils in the same group have different polarities, so that distortions in generation voltage will be restrained, and therefore the iron loss will be reduced. Consequently, it becomes possible to provide a very efficient motor.

In the above-described motor, cuts are provided in the plurality of stator teeth forming the stator core so that the distance between the stator opposing surface of the rotor and the rotor opposing surface of the stator teeth at the tip end is greater in the vicinity of the circumferential ends of said tip ends. In this way, abrupt changes in the magnetic field at the stator teeth is alleviated, so that the waveform of counter electromotive voltage generated at the coil at the time of driving the motor will be more approximated to a sine waveform, and torque ripple and cogging torque will be reduced.

In the above described motor, in the stator core, the tip end of at least one of the stator teeth forming the plurality of groups on the side of the rotor is provided with at least one recess. The recess has a substantially rectangular or arc shape. It is understood that other shapes may be employed.

In this way, the magnetic poles at the tip ends of these stator teeth are divided into S, N, and S poles in appearance, a high torque will be provided, and torque ripple will be reduced to a small level.

In the above-described motor, a side surface of the stator yoke on the side opposite to the rotor side in the stator core is in a shape protruding more onto the opposite side to the rotor side beyond a circle inscribed to each side surface of the stator yoke on a side surface on the opposite side to the rotor side of the plurality of stator teeth, and the width w of the stator yoke is equal for the entire circumference. Furthermore, the relation between the width w of the stator yoke and the width W of the parallel part of the stator tooth around which a coil is wound is represented by the following expression:

$W \times \frac{1}{2} \leq w \leq W \times \frac{3}{2}$.

In this way, the magnetic resistance becomes well balanced, and a substantially homogeneous flux is generated. Consequently, a stable and efficient magnetic field will be provided.

In the above-described motor, the rotor has a plurality of permanent magnets and a plurality of slits on the opposite side to the stator side of the permanent magnets. Each of the plurality of slits has substantially the same shape as that of the permanent magnet and a width smaller than the thickness of the permanent magnet.

In this way, a magnetic flux generated at the permanent magnets are less easily passed at the slits, in other words, the magnetic resistance there is increased, d-axis inductance is reduced, and the difference between the d-axis inductance and the q-axis inductance is increased. In this way, a larger reluctance torque will be generated, so that the torque generated by the motor will be increased.

In the above-described motor, the rotor is provided with a plurality of permanent magnets each having a shape in such a manner that the distance between the stator side surface of each of the plurality of permanent magnets and the stator opposing surface of the rotor is larger toward the central part than at the ends of each of the permanent magnets. In addition, the permanent magnets are in a substantially V shape that protrudes in a direction opposite to the side of the stator opposing surface of the rotor. Alternatively, the rotor is provided with a plurality of permanent magnets in a linear shape perpendicular to the radial direction of the rotor. Alternatively, the rotor is provided with a plurality of permanent magnets in an arc shape that protrudes in a direction opposite to the stator opposing side of the rotor. Alternatively, the rotor is provided with a plurality of permanent magnets in an arc shape that protrudes toward the stator opposing surface and has a radius greater than the radius of the rotor core.

In this way, there are a part that relatively easily passes a magnetic flux and a part that less easily passes a magnetic flux, in other words, parts with low magnetic resistance and high magnetic resistance are provided, so that difference is produced between the inductance in the q-axis direction and d-axis direction. Thus, a reluctance torque will be generated, and an increased torque will be generated.

The above-described motor is related to a technique of increasing the number of poles for a motor, in the relation between the number of poles at the rotor portion and the number of tooth poles at the stator portion to be provided with a coil, as compared, for example, to four poles and twelve tooth poles for a typical brushless motor, the number of poles is larger as there are ten poles and nine tooth poles, but the number of tooth poles is reduced despite the increased total number of poles.

The motor torque is determined as:

(Motor torque)=(the number of rotor pole pairs)×(the number of interlinked magnetic fluxes)×(motor current).

Therefore, in the motor, the number of rotor poles is increased, and yet the number of stator tooth poles is not increased, in other words, the motor current is not decreased.

Furthermore, since the widths of the slot opening and stator teeth are set as described above, the waveform of the counter electromotive voltage will be approximated to a sine wave with a large torque as compared to a conventional motor in the same size, and an aluminum wire will then be used for the coil instead of a copper wire without increasing the size of the above-described motor and without increasing distortions in the waveform of the counter electromotive voltage as compared to the conventional motor.

BEST MODE FOR CARRYING OUT THE INVENTION

Now, an embodiment of the present invention will be described in conjunction with the accompanying drawings.

Embodiment 1

Figure 1:
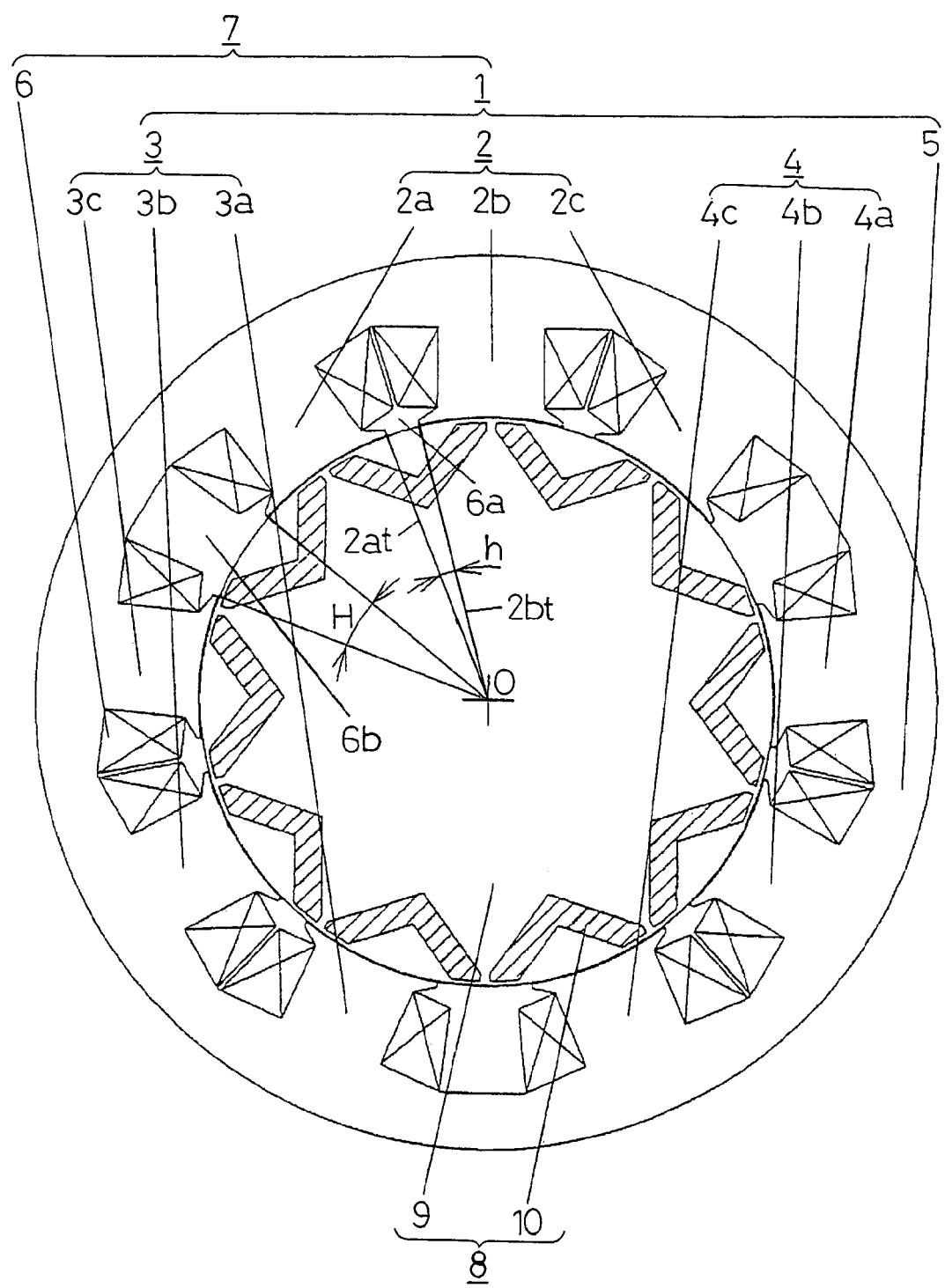
FIG. 1 is a schematic sectional view of a main part of a motor according to Embodiment 1 of the present invention for use in illustration of the motor main part.
Figure 2:
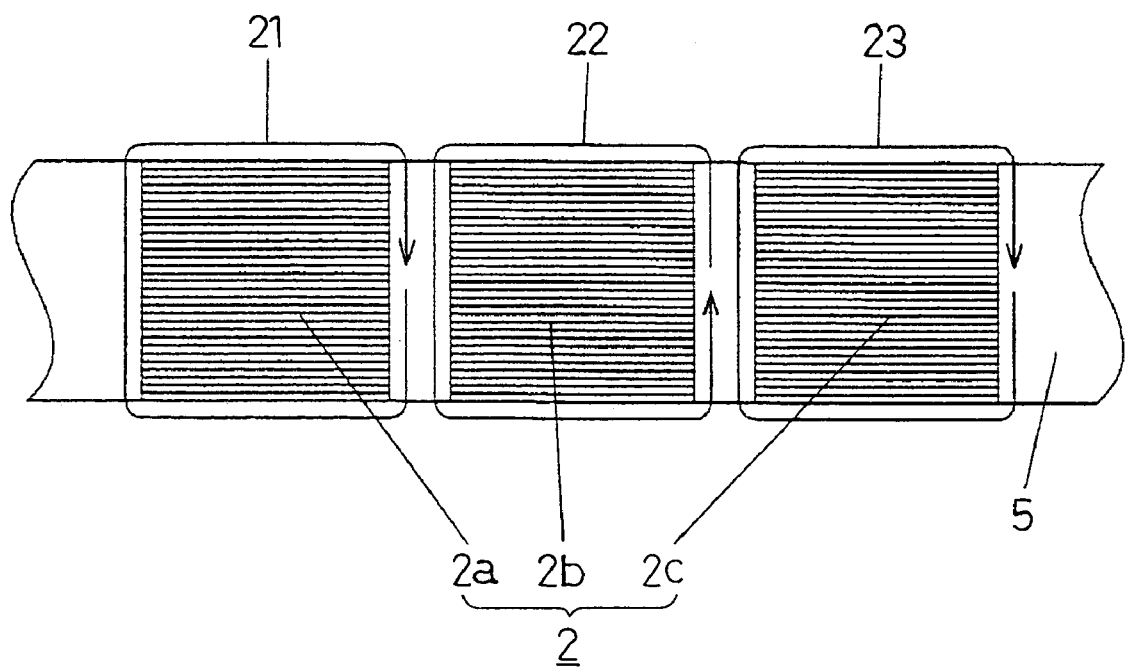
FIG. 2 is a schematic development for use in illustration of the direction in which coils are wound according to the Embodiment 1 of the present invention.
Figure 3:
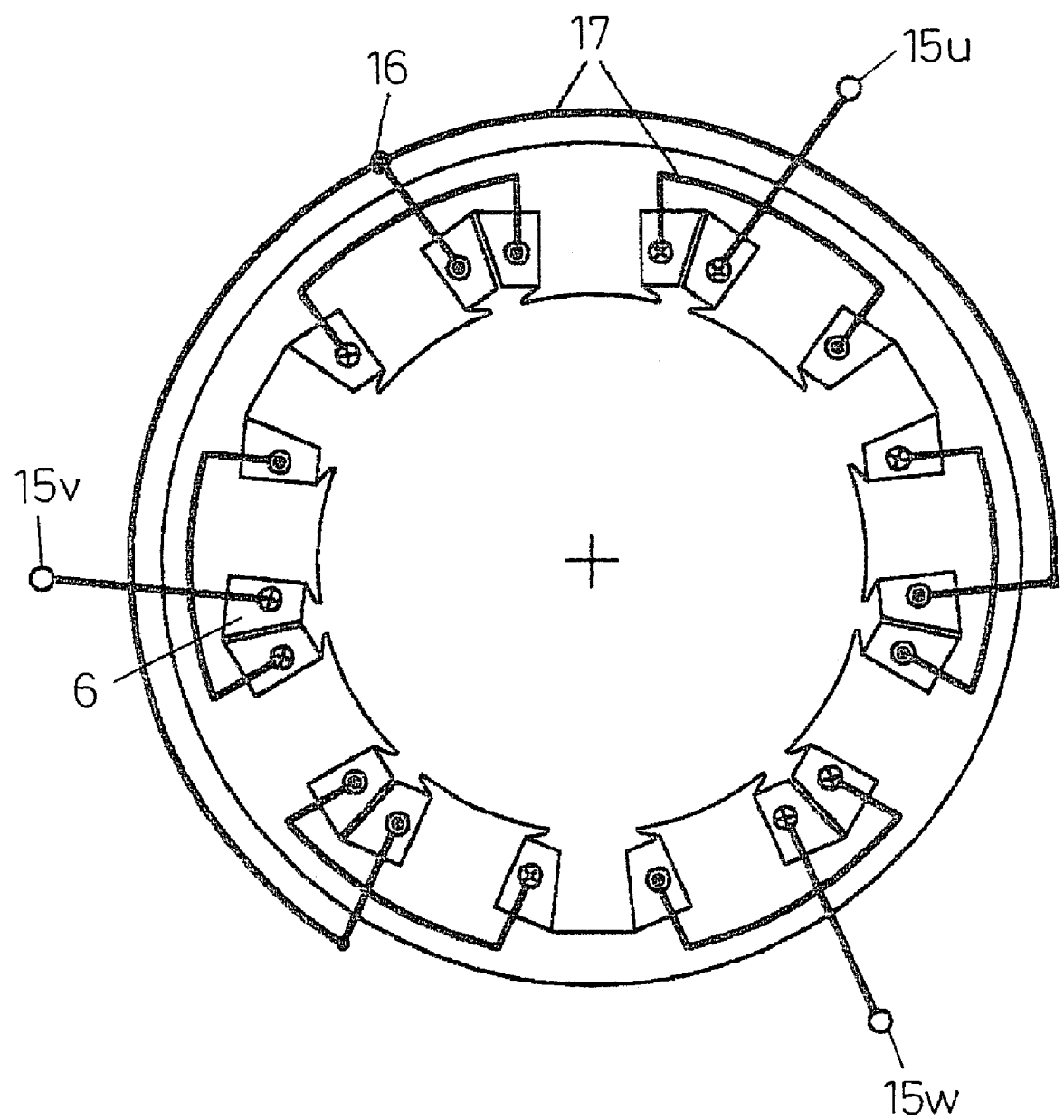
FIG. 3 is a view showing how coils are connected according to the Embodiment 1 of the present invention.

FIGS. 1 to 4D are views for use in illustration of a motor according to Embodiment 1 of the present invention. FIG. 1 is a sectional view of a main part in a plane orthogonal to the central axis of the rotating shaft for the purpose of illustrating the motor main part, FIG. 2 is a development for use in illustration of the direction in which coils are wound around stator teeth, FIG. 3 is a view for use in illustration of how coils wound around stator teeth are connected, and FIGS. 4A to 4D are sectional views of the shapes of permanent magnets embedded in rotor cores and other examples of the rotor cores.

In FIG. 1, a stator core 1 includes a plurality of stator teeth 2a, 2b, 2c, 3a, 3b, 3c, 4a, 4b, and 4c, and a stator yoke 5 that connects the stator teeth 2a to 4c at one end. A coil 6 is wound around each of the stator teeth 2a to 4c, and the stator core 1 and the coils 6 form a stator 7.

The stator teeth 2a to 4c are divided into three groups in total, each of which has a plurality of adjacent stator teeth having coils wound around to be provided with voltage in phase. More specifically, according to the embodiment, there are a first group 2 having stator teeth 2a, 2b, and 2c, a second group 3 having stator teeth 3a, 3b, and 3c, and a third group 4 having stator teeth 4a, 4b, and 4c. As for the angles of the openings of the slots formed between the adjacent stator teeth, the slot opening of a slot 6a formed between the stator teeth 2a and 2b adjacent to each other in the first group 2 will be described as an example. The letter h represents the angle between the tangents 2at and 2bt in contact with the ends at the tip of the stator teeth 2a and 2b projecting in the circumferential direction on the opposite side to the stator yoke and passing the center O of the rotating shaft. Similarly, the angles of the other slot openings are each the angle between tangents passing the center O of the rotating shaft and in contact with the opposing ends on the slot side.

The angles of the slot openings between the stator teeth 2b and 2c, between the stator teeth 4a and 4b, between the stator teeth 4b and 4c, between the stator teeth 3a and 3b, and between the stator teeth 3b and 3c are each set to be equal to the slot opening angle h between the stator teeth 2a and 2b. Meanwhile, the angle of a slot opening 6b between the adjacent stator teeth 3c and 2a belonging to different groups is H. Similarly, the angles of the slots between the stator teeth 2c and 4a and between the stator teeth 4c and 3a are set to be equal to the angle H of the slot opening between the stator teeth 3c and 2a. Note that the angle H is larger than the angle h of the slot opening between adjacent stator teeth belonging to the same group as described above.

The coil 6 wound around each of the stator teeth 2a to 4c will be described with reference to the group 2 as an example. As shown in FIG. 2, when the coil 6 is wound around the stator tooth 2a in the direction denoted by the arrow 21, the coil 6 is wound around the stator tooth 2b in the direction denoted by the arrow 22 that is opposite to the direction of the arrow 21, and the coil 6 is wound around the stator tooth 2c in the direction denoted by the arrow 23 that is opposite to the direction of the arrow 22, in other words, the same as the arrow 21. More specifically, the coils are wound around the stator teeth in each group in opposite directions for adjacent stator teeth in the group to which the stator teeth belong, so that the adjacent stator teeth have polarities inverted from each other. The coils 6 are wound around the stator teeth 2a, 2b, and 2c in parallel. It is understood that the coils may be wound in series. Similarly, the coils 6 are wound around the stator teeth included in the groups 3 and 4 in the same manner, so that the coils 6 in the groups 2, 3, and 4 are to be coils in three phases, U, V, and W phases, respectively. When, for example, the coil 6 for the stator tooth 2a in the group 2 is in the U phase, the coil 6 for the adjacent stator tooth 2b having a polarity inverted from that of the coil 6 for the stator tooth 2a is in the inverted U phase, and the coil 6 for the stator tooth 2c adjacent to the stator tooth 2b is in a phase inverted from the phase of the coil 6 for the stator tooth 2b, in other words, in the U phase that is the same as the phase of the stator tooth 2a. This applies to the coils for the stator teeth in the groups 3 and 4, and the phases are the V phase and the inverted V phase, and the W phase and the inverted W phase, respectively. Furthermore, the end of winding of the coils 6 for the groups 2, 3, and 4 are connected as shown in FIG. 3. Note that in FIG. 3, 15u, 15v, and 15w are the output ends in the U, V, and W phases, respectively, 16 represents the mid point, and 17 is a line connecting the coils 6. In the above described manner, the adjacent coils in the U, V, and W phases in each group have polarities different from each other, so that deviations in the magnetic field distribution is alleviated, and waveform distortions in counter electromotive voltage generated between terminals at the time of driving the motor is reduced, so that the iron loss is reduced.

As a result of further study, when the relation represented by the following expression is satisfied for the angle h of the slot opening formed between adjacent stator teeth in the same group and the angle H of the slot opening formed between adjacent stator teeth belonging to different groups, $$h < H \leq 3h \qquad (1)$$

the magnetic field distribution is homogeneous, so that waveform distortions in the counter electromotive voltage is reduced, eddy current is reduced to reduce the iron loss, and heat generation by the eddy current at the permanent magnets is reduced. In this way, demagnetization of the magnets will be reduced. Consequently, the motor improves efficiency.

Meanwhile, a rotor 8 includes a rotor core 9 and a plurality of substantially V-shaped permanent magnets 10 embedded in the rotor core 9 at equally spaced intervals in the circumferential direction, the stator opposing surface of the rotor 8 opposes the rotor opposing surface of the stator 7 with a very small gap therebetween. The rotor is rotatable around the center O of the rotating shaft.

The permanent magnets 10 are substantially in a V-shape that protrudes in the direction opposite to the stator opposing surface of the rotor 8, the distance between the stator side surface 10a of the permanent magnet 10 and the stator opposing surface 8a of the rotor 8 is larger toward the central part 10d than at the ends 10b and 10b on the stator side surface 10a of the permanent magnet 10. Therefore, there are a part that relatively easily passes a magnetic flux and a part that less easily passes a magnetic flux on the stator opposing part of the rotor 8. More specifically, the parts with low magnetic resistance and high magnetic resistance are provided, so that difference is produced between the inductance in the q-axis direction and d-axis direction. Thus, a reluctance torque is generated, and then torque generation is increased.

Figure 4A:
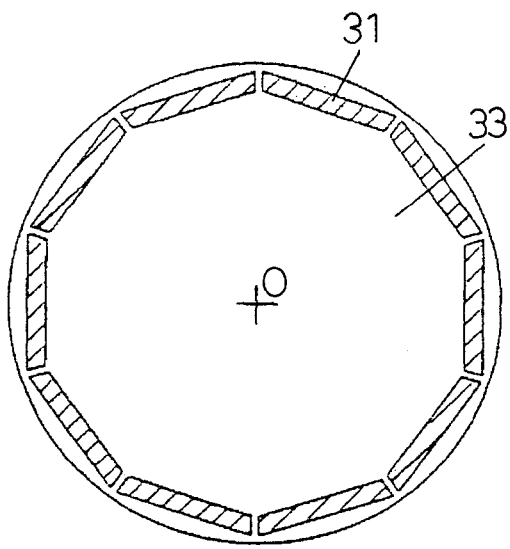
FIGS. 4A to 4C are schematic sectional views of other examples of the permanent magnets according to the Embodiment 1 of the present invention.
Figure 4B:
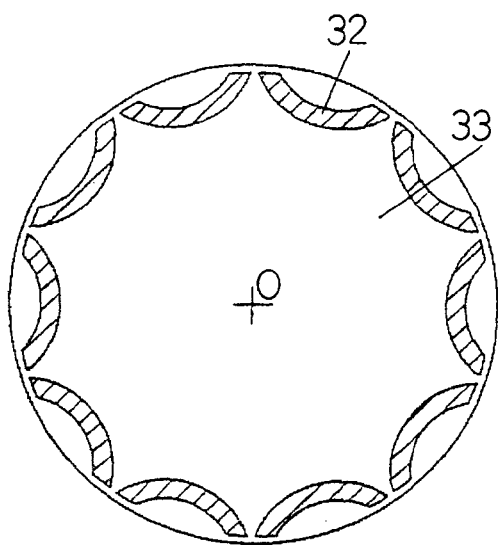
Figure 4C:
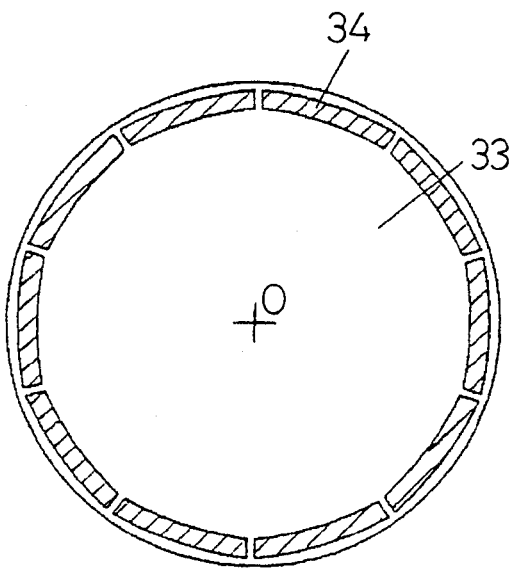
Figure 4D:
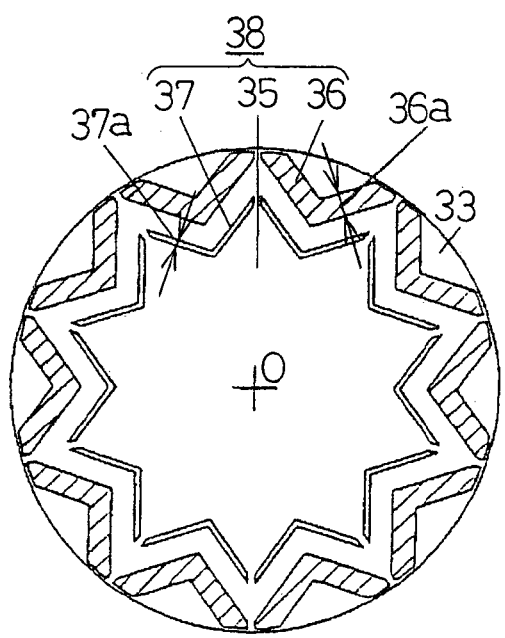
FIG. 4D is a schematic sectional view of another example of the rotor core according to the Embodiment 1 of the present invention.

The shape of the permanent magnet 10 may be any shape as long as the distance between its side surface 10a and the stator opposing surface 8a of the rotor 8 is larger toward the central part than at the end part. For example, the permanent magnet may be a linear shaped permanent magnet 31 arranged perpendicularly to the radial direction as shown in FIG. 4A, an arc permanent magnet 32 curved outwardly in the direction opposite to the stator side as shown in FIG. 4B or an arc permanent magnet 34 curved outwardly to the stator side and having a radius equal to or larger than the radius of a rotor core 33 as shown in FIG. 4C. Furthermore, as shown in FIG. 4D, a rotor 38 may include a rotor core 35 having permanent magnets 36 embedded therein and slits 37 provided more on the side opposite to the stator side (not shown) than the permanent magnets 36 and having a shape substantially the same as that of the permanent magnet 36 and a width 37a smaller than the thickness 36a of the permanent magnet 36. Since the slits are provided near the permanent magnets, it is difficult for a magnetic flux generated by the permanent magnets to pass at the slit location, so that the d-axis inductance is reduced and the difference between the d-axis inductance and the q-axis inductance is increased, and that a large reluctance torque is generated. Consequently, the torque generated by the motor increases. It is understood that for the rotor core 35 with the slits, the shape of the permanent magnet may be a linear shape or an arc shape curved outwardly to the stator side or the opposite side, as shown in FIGS. 4A to 4C.

Note that according to Embodiment 1, the number of slots formed between the plurality of stator teeth is nine (as many as the number of the stator teeth), the number of the permanent magnets forming the rotor is ten, the number of sets of coils is one as coils in three phases U, V, and W phases are counted as a set. The number of stator teeth per group is three. More specifically, Embodiment 1 is related to a motor with three stator teeth per group, one set of coils, nine slots, and ten poles. The invention is not limited to the motor with three stator teeth per group, one set of coils, nine slots, and ten poles, and is also applicable to a motor with n stator teeth per group, s sets of coils, t slots and p poles (where n, s, t, and p are all a positive integer). Note in this case, the number of rotor poles p satisfies the following expression:

$$P=2\times(s(\pm1+3k)) \text{ and } p>t \text{(where k is a positive integer)} \quad (2)$$

Here, why the number of poles is determined as described above will be described. One characteristic of the motor according to the invention resides in that the pitch between the magnets and the teeth pitch in the stator are the same, and there is a dead space in the stator. Therefore, once the number of teeth per group and the number of sets of coils are determined, the number of poles may be mechanically provisionally determined. For example, in a model of "two stator teeth per group and one set of coils" in a three-phase motor, the number of slots (t) is produced by the number of teeth per group (n)×the number of phases×the number of sets of coils (s), in other words, the number of slots (t)=2×3×1=6. Since the number of slots (t) is six, in order to secure the dead space, the number of poles (p) is an even number equal to or larger than eight based on the above expression (2).

Now, the number of slots and the number of poles provisionally determined are used to determine if the motor functions as a motor. More specifically, it is determined whether the motor smoothly rotates when current is passed in the order of the U phase, V phase, and W phase. When the number of pole pairs for the magnet is p/2, the inductive voltage function for the magnet will be represented as follows:

$$Be=\sin(p/2\times\theta)$$

Now, since the motor is a three-phase motor, the U, V, and W phases are shifted at intervals of 120 electrical degrees. Therefore, when current is passed through these phases, as the current is 120 electrical degrees shifted from each other, the rotor needs only be rotated for the same electrical angle in the same direction. In other words, the following expression should be satisfied.

$$\sin(p/2\times(\theta+120/s))=\sin(p/2\times\theta\pm120+360\ k) \quad (3)$$

The above expression (3) indicates that when the inductive voltage function (rotor) is positioned 120 electrical degrees shifted from a certain time point Be=0 (the expression is based on mechanical angle), and this position is the same as the position 120° (the deviation among the U, V, and W phases) shifted on another axis on the stator side, current passed from the U phase to the V phase or from the V phase to the W phase in other words between positions 120° shifted from each other allows the rotor position Be (inductive voltage function) to always take the same electrical value, and the motor smoothly rotates once.

The above expression (3) is expressed as follows for the pole pair number p/2.

$$p/2=s(\pm1+3\ k)$$

The pole number (p) is expressed as a function of the coil set number (s) as follows:

$$p=2\times(s(\pm1+3k))$$

Using this expression, the number of poles is determined. Note that specific examples are given in the following table.

| number of teeth per group | number of coil sets | number of slots | number of poles |
|---|---|---|---|
| 2 | 1 | 6 | 8 |
| 2 | 2 | 12 | 16 |
| 2 | 3 | 18 | 24 |
| 2 | 4 | 24 | 32 |
| 3 | 1 | 9 | 10 |
| 3 | 2 | 18 | 20 |
| 3 | 3 | 27 | 30 |
| 3 | 4 | 36 | 40 |
| 4 | 1 | 12 | 14 |
| 4 | 1 | 12 | 16 |
| 4 | 2 | 24 | 28 |
| 4 | 2 | 24 | 32 |
| 5 | 1 | 15 | 16 |
| 5 | 1 | 15 | 20 |
| 5 | 1 | 15 | 22 |
| 5 | 2 | 30 | 32 |
| 5 | 2 | 30 | 40 |
| 6 | 1 | 18 | 20 |
| 6 | 1 | 18 | 22 |
| 6 | 1 | 18 | 26 |
| 6 | 2 | 36 | 40 |
| 7 | 1 | 21 | 22 |
| 7 | 1 | 21 | 26 |
| 7 | 1 | 21 | 28 |

As in the foregoing, according to the Embodiment 1, among the stator teeth of the stator, adjacent stator teeth having coils wound around to be provided with voltage in the same phase are counted as one group, and the stator teeth are divided into three groups for the U, V, and W phases. The coils are wound in the opposite directions around adjacent stator teeth belonging to the same group, while the distance between the stator side surface of the plurality of permanent magnets embedded in the rotor and the stator opposing surface of the rotor is larger toward the central part than at the end side of the permanent magnets. In this way, a reluctance torque is used in addition to the magnet torque, so that a high torque is generated. Distortions in the generated voltage are reduced, which reduces the iron loss and restrains the permanent magnets from being demagnetized. Consequently, a very efficient motor will be provided.

Embodiment 2

Figure 5:
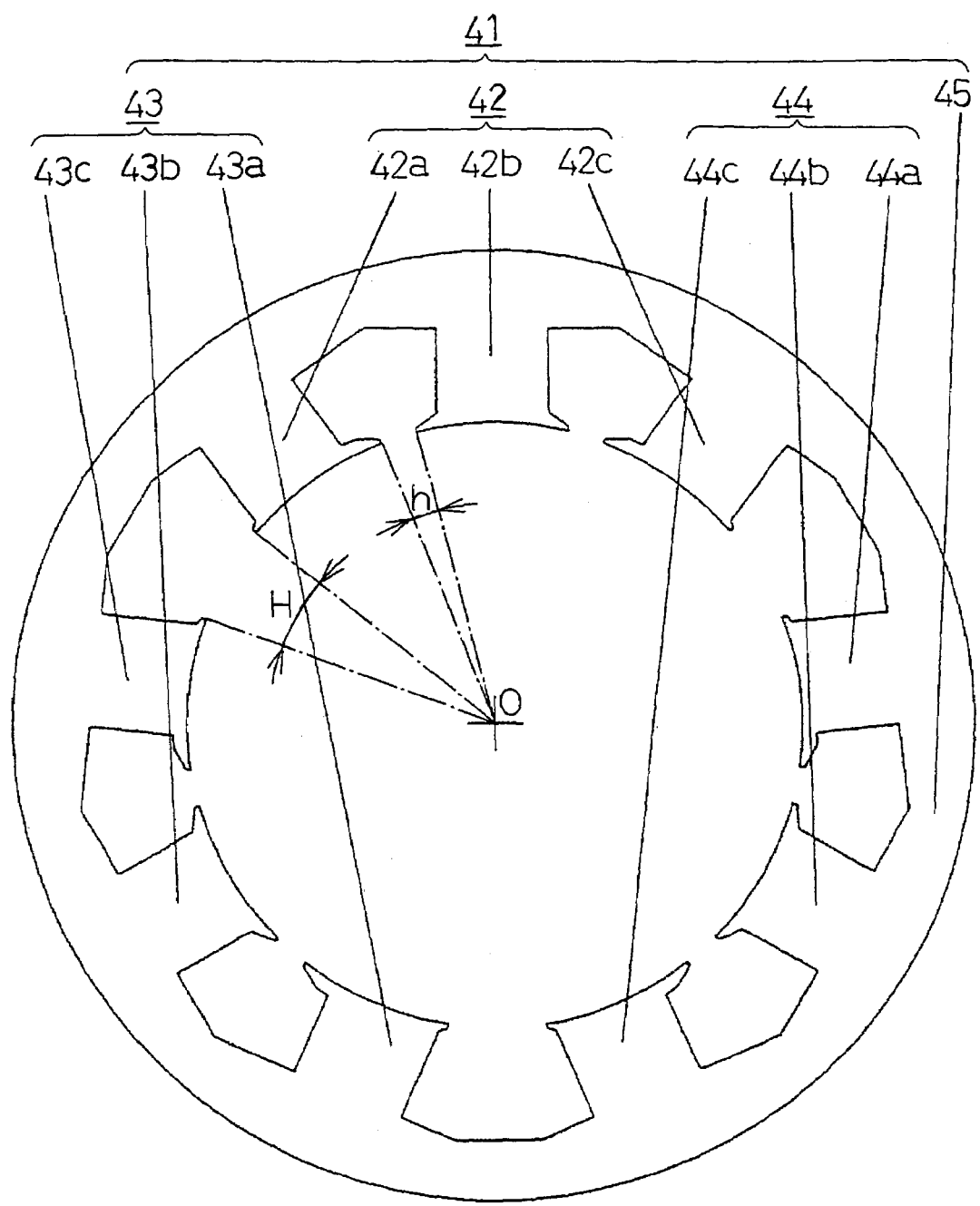
FIG. 5 is a schematic sectional view of a stator core according to Embodiment 2 of the present invention for use in illustration of the stator core.
Figure 6A:
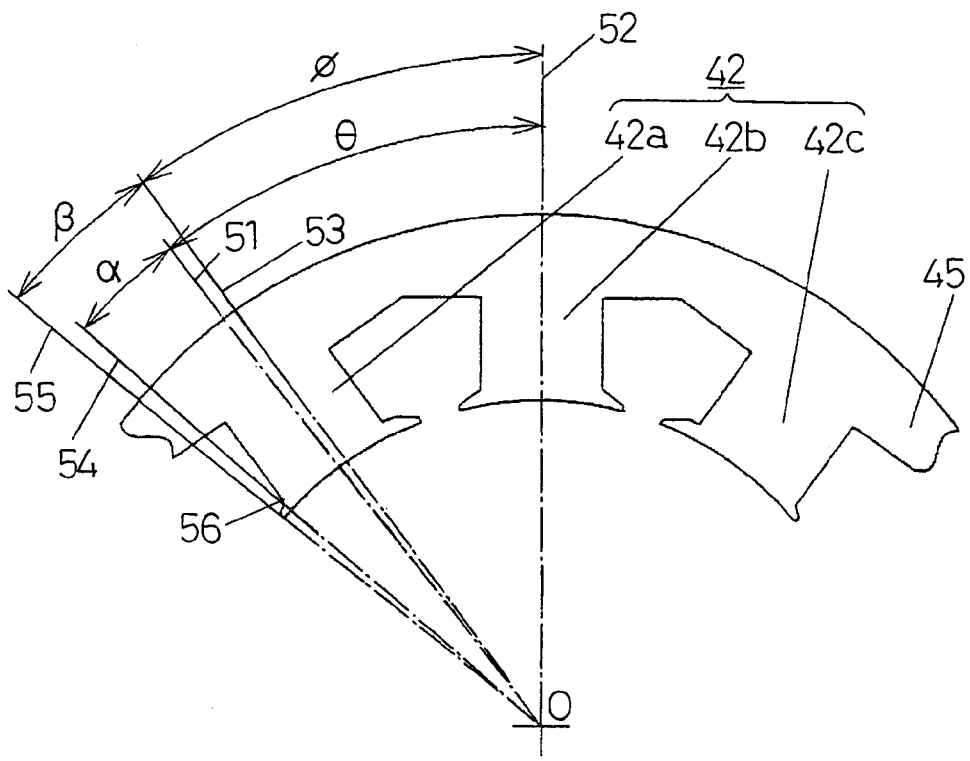
FIG. 6A is a partially enlarged view for use in illustration of the stator core according to the Embodiment 2 of the present invention.
Figure 6B:
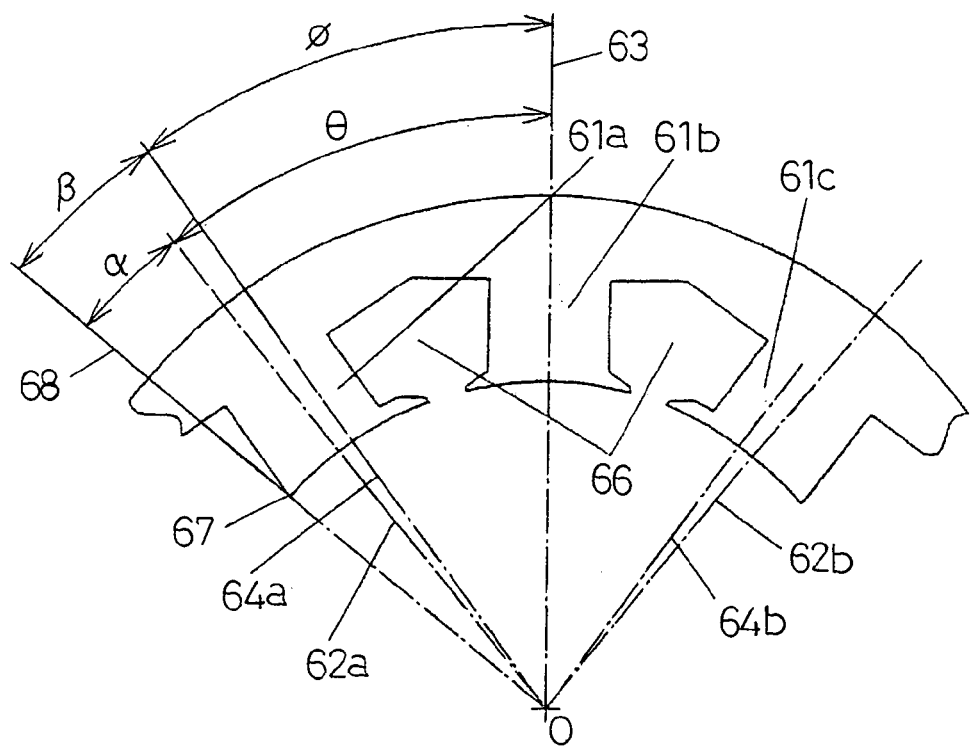
FIG. 6B is a partially enlarged view for use in illustration of a modification of the stator core according to the same embodiment.
Figure 7:
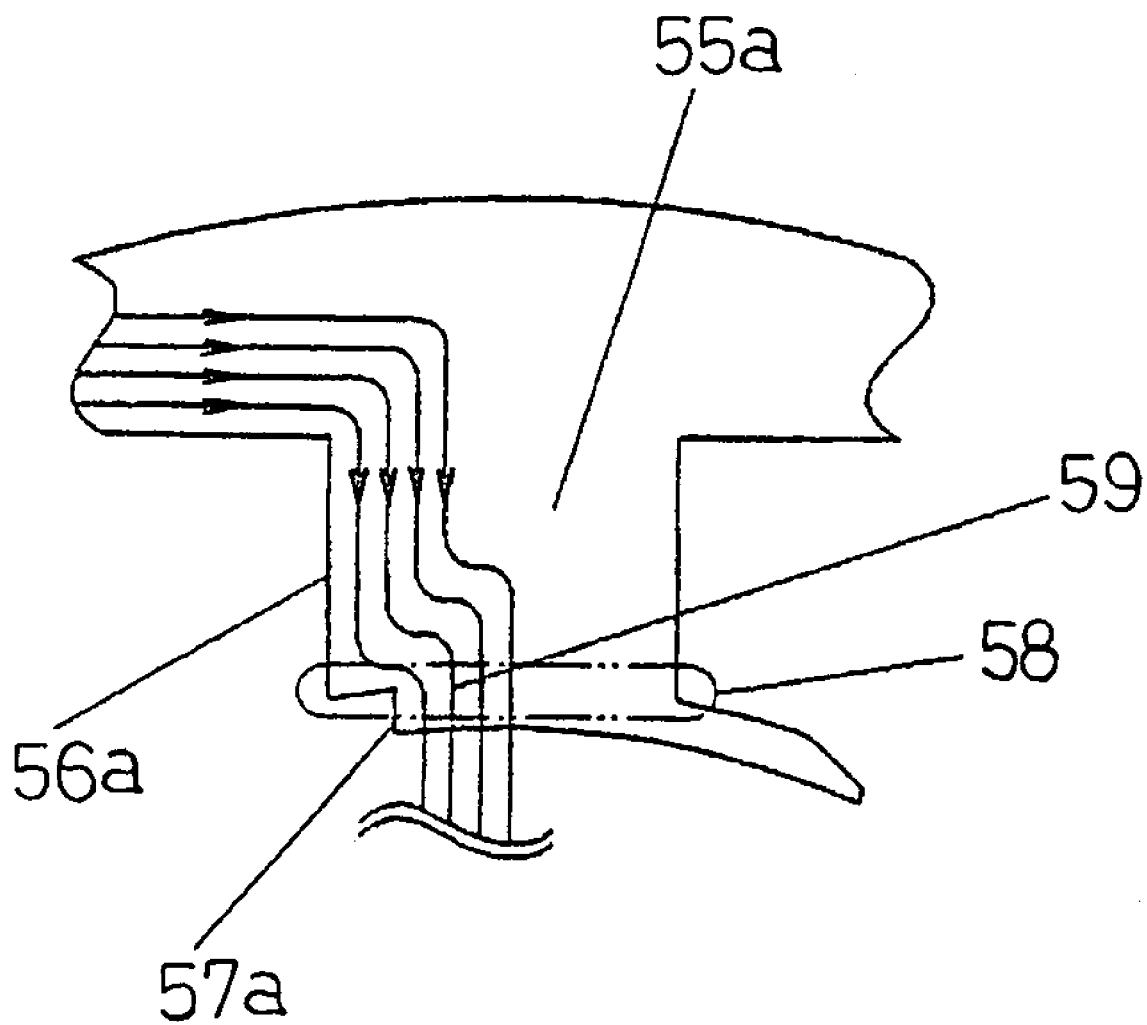
FIG. 7 is a partially enlarged view for use in illustration of an example of the shape of a stator tooth that is not suitable for the present invention.

FIGS. 5 to 7 are views for use in illustration of a motor according to Embodiment 2 of the present invention, FIG. 5 is a top view of a stator core, FIG. 6A is a partially enlarged view showing a part of FIG. 5 being enlarged, FIG. 6B is a partially enlarged view showing a part of a modification of the stator core being enlarged, and FIG. 7 is a enlarged view showing a modification of the tip end of a stator tooth.

In FIG. 5, a stator core 41 includes stator teeth 42a, 42b, 42c, 43a, 43b, 43c, 44a, 44b, and 44c, and a stator yoke 45 that connects these stator teeth 42a to 44c at one end. Similarly to Embodiment 1, the stator teeth 42a, 42b, and 42c form a group 42, the stator teeth 43a, 43b, and 43c form a group 43, and the stator teeth 44a, 44b, and 44c form a group 44. The coils (not shown) wound around the stator teeth in the groups 42, 43, and 44 form U, V, and W phases, respectively. Similarly to Embodiment 1 described above, the directions in which coils are wound around adjacent teeth in the same group are inverted, and the relation between the angle h of a slot opening between adjacent stator teeth in the same group and the angle H of a slot opening formed between adjacent stator teeth belonging to different groups satisfies the foregoing expression (1).

The slots between the stator teeth are formed to be spaces having substantially equal sizes, so that the number of turns at coils wound around the stator teeth will be increased, and the generation torque will then be increased according to the increase in the number of turns.

Now, with reference to the group 42 described above, the shape of the stator teeth 42a, 42b, and 42c at their tip ends will be descried in conjunction with FIG. 6A.

FIG. 6A is a partially enlarged view showing the group 42 in the stator core 41. In FIG. 6A, θ represents the angle formed by the central line 51 passing through the circumferential center of the parallel part of the stator tooth 42a and the center O of the rotating shaft and the central line 52 passing through the circumferential center of the parallel part of the stator tooth 42b and the center O of the rotating shaft. The letter φ represents the angle between the central line 53 passing through the circumferential center of the tip end of the stator tooth 42a and the center O of the rotating shaft and the central line 52 passing through the circumferential center of the parallel part of the stator tooth 42b and the center O of the rotating shaft. The letter α represents the angle between the line 54 passing through the side of the parallel part of the stator tooth 42a opposite to the stator tooth 42b, the angular portion 56 at the tip end, and the center O of the rotating shaft, and the central line 51 in the stator tooth 42a. The letter β represents the angle between the line 55 in contact with the circumferential end at the tip of the stator tooth 42a opposite the stator tooth 42b and the center O of the rotating shaft and the central line 53 passing through the circumferential center of the tip of the stator tooth 42a and the center O of the rotating shaft. The central line 51 of the parallel part in the stator tooth 42a and the central line 53 passing through the circumferential center of the tip end of the stator tooth 42a are deviated from each other. More specifically, the relation represented by $(\phi+\beta)>(\theta+\alpha)$ is satisfied. Meanwhile, the other stator tooth 42c in the group 42 has a shape symmetric to the stator tooth 42a with respect to the central line 52 of the stator tooth 42b.

In general, the widths of the parallel parts around which the coils for the stator teeth are wound are formed to be substantially equal so that the density of magnetic fluxes generated by the coils is substantially equalized. Consequently, in order to substantially equalize the spaces formed between the stator teeth, in other words, to equalize the sizes of the slot spaces, the following expression should be established.

$\theta=\theta_a=360/n°$ (n: the number of slots)

$=360/9°$ (n=9 in Embodiment 2)

$=40°$

Meanwhile, FIG. 6B is a partially enlarged view showing a modification of the stator core shape. In FIG. 6B, the basic configuration is the same as that described in conjunction with FIG. 6A, and in the modification, the tip end shape of the stator teeth 61a and 61c is different from that of the foregoing example protruding toward both circumferential sides described above and does not project in the circumferential direction on the opposite side of the stator tooth 61b. More specifically, the shape conforms to the side of the parallel part. In this way, a line 68 passing through the front most tip 67 of the parallel part of the stator tooth 61a on the side surface opposite to the stator tooth 61b and the center O of the rotating shaft and a tangent line 68 in contact with the circumferential end of the stator tooth 61a on the opposite side to the stator tooth 61b and passing through the center O of the rotating shaft are the same. In this configuration, their angular relation is represented as $(\phi+\beta)=(\theta+\alpha)$. Then, the central lines 64a and 64b passing through the circumferential centers of the tip ends of the stator teeth 61a and 61c, respectively (which are symmetric with respect to the central line 63 passing through the circumferential center of the stator tooth 61b and the center O of the rotating shaft) and the center O of the rotating shaft are deviated from the central lines 62a and 62b passing through the circumferential centers of the parallel parts of the stator teeth 61a and 61c, respectively and the center O of the rotating shaft. Therefore, the slot spaces 66 between the stator tooth 61b and the adjacent stator teeth 61a and 61c have the same volume and are relatively large. Therefore, the number of turns in the coils is increased. Note that in this case, the relation between the angle h of a slot opening between adjacent stator teeth in the same group and the angle H of a slot opening formed between adjacent stator teeth belonging to different groups satisfies the foregoing expression (1) according to the Embodiment 1 described above.

The shape of the tip end of the stator teeth in the other groups should be the shape that satisfies the relation represented by $(\phi+\beta)>(\theta+\alpha)$ by the same method applied to the stator teeth 42a to 42c. When a motor having stator teeth in the shape of the stator teeth 61a to 61c is formed, the shape of the tip ends of the stator teeth in the other groups needs only satisfy the relation represented by $(\phi+\beta)=(\theta+\alpha)$.

However, when a stator tooth having a shape as shown in FIG. 7 is formed, the circumferential center of the tip end of the stator tooth 55a is deviated from the circumferential center of the parallel part of the stator tooth 55a, but the side surface 56a of the parallel part extends beyond the circumferential projection 57a of the tip end in the circumferential direction. More specifically, $(\phi+\beta)<(\theta+\alpha)$ stands, and the area of the boundary part 58 between the parallel part and the tip end part of the stator tooth 55a is reduced. When the area of the boundary part 58 is reduced, a magnetic flux 59 generated at the stator tooth 55a is concentrated and more easily saturated, and the direction of the magnetic flux 59 changes abruptly. Therefore, the magnetic resistance increases at the boundary part 58 with the abrupt change and the flow of magnetic flux is inefficient. Therefore, the configuration that allows the deviation relation between the parallel part and the tip end part to be represented by $(\phi+\beta)<(\theta+\alpha)$ is not preferable.

In the configuration similar to that of the Embodiment 1 described above, a stator includes a stator core and coils arranged around a plurality of stator teeth, a rotor rotates around the center of the rotating shaft with a very small gap apart from the rotor opposing surface of the stator, the rotor includes a rotor core and a plurality of permanent magnets embedded in the rotor core at equally spaced intervals in the circumferential direction, and the stator opposing surface of the rotor opposes the rotor opposing surface of the stator.

Note that according to the embodiment, a motor has three stator teeth per group as an example, but as described in conjunction with the Embodiment 1, the invention is applicable to a motor with n stator teeth per group (n: positive integer). In the case, regardless of whether the number of teeth per group is an even number or an odd number, only two stator teeth at both ends of a group, in other words, only two stator teeth belonging to the same group and yet each adjacent to a stator tooth in another group should have a shape in which a central line passing through the circumferential center of the tip end is deviated from the central line of the parallel part. Note that in this case, the central line passing through the circumferential center of the tip end and the central line passing through the circumferential center of the parallel part are preferably deviated within the range of $(\phi+\beta) \geqq (\theta+\alpha)$.

As described above, according to Embodiment 2, similarly to the embodiment described above, a plurality of stator teeth are divided into three groups. In the same group, the central lines through the parallel parts having coils wound around in the stator teeth adjacent to the stator teeth in the center of the group that passes through the center of the rotating shaft are deviated from the central lines passing through the circumferential center of the tip end parts of the stator teeth opposite to the stator yoke and the center of the rotating shaft. In this way, the slot spaces formed by the adjacent stator teeth are increased, and the number of turns in coils around the stator teeth is also increased. Similarly to the Embodiment 1 described above, the rotor having a plurality of embedded permanent magnets (hereinafter simply referred to as the "permanent magnet-embedded rotor") has a shape such that the distance between the stator opposing surface of the rotor and the stator side surface is greater on the central part than on the end part of the stator side surface. In this way, a reluctance torque is added to the magnet torque then a higher torque will be generated. In the same group, coils are wound in the opposite directions around adjacent stator teeth, so that distortions in the generated voltage are reduced, which reduces the iron loss, and a very efficient motor will be provided.

Embodiment 3

Figure 8:
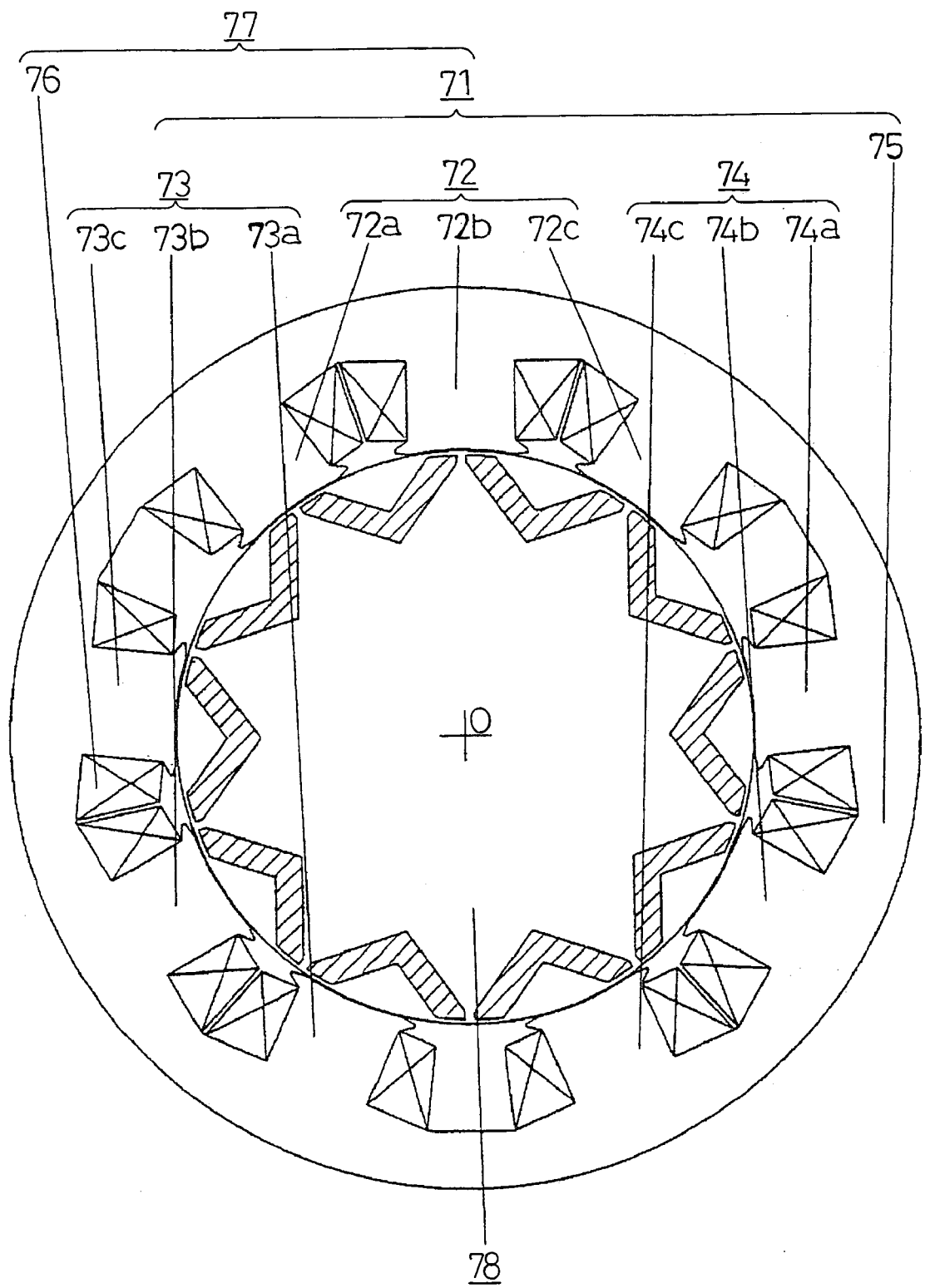
FIG. 8 is a schematic sectional view for use in illustration of a main part of a motor according to Embodiment 3 of the present invention.
Figure 9:
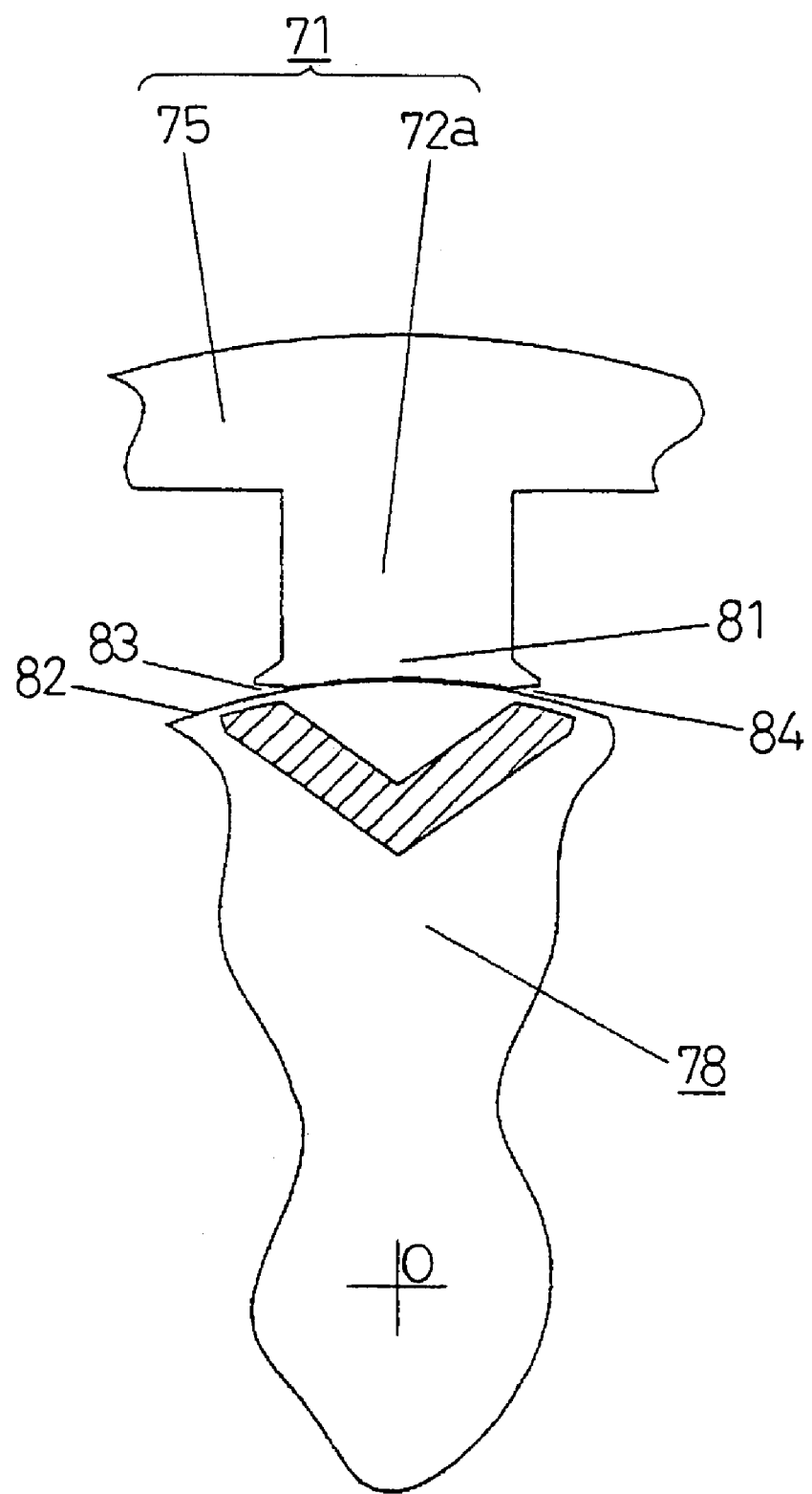
FIG. 9 is a partially enlarged view for use in illustration of a stator core according to the Embodiment 3 of the present invention.

FIGS. 8 and 9 are views for use in illustration of a motor according to Embodiment 3 of the present invention. FIG. 8 is a schematic sectional view of a stator core and a rotor opposing the inner circumferential surface of the stator core taken along a plane perpendicular to the central axis of the rotating shaft and FIG. 9 is a partially enlarged view showing a stator core being enlarged for the purpose of showing the shape of stator teeth forming the stator core.

In FIG. 8, a stator core 71 includes stator teeth 72a, 72b, 72c, 73a, 73b, 73c, 74a, 74b, and 74c, and a stator yoke 75, and similarly to the Embodiment 1 described above, the plurality of stator teeth 72a to 74c are divided into three groups 72, 73, and 74. In the same group, coils 76 are wound around adjacent stator teeth in opposite directions to each other. The stator core 71 and the coils 76 arranged around the stator teeth 72a to 74c of the stator core 71 form the stator 77. There is a small gap between the rotor opposing surface at the tip end of the stator teeth on the opposite side to the stator yoke and the stator opposing surface of the permanent magnet embedded rotor 78 that rotates around the center O of the rotating shaft. Similarly to the Embodiment 1 described above, the relation between the angle h of a slot opening between adjacent stator teeth in the same group and the angle H of a slot opening formed between adjacent stator teeth belonging to different groups satisfies the foregoing expression (1).

FIG. 9 is a partly enlarged view of the stator core 71 particularly showing the group 72 in FIG. 8 as an example. Now, FIG. 9 will be described. At the circumferential ends of the tip end 81 of the stator tooth 72a (that is part of the stator core 71) on the opposite side to the stator yoke, cut parts 83 and 84 are formed so that the rotor opposing surface at the tip end 81 of the stator tooth 72a that opposes the stator opposing surface 82 of the rotor 78 is apart from the stator opposing surface 82 of the rotor 78 in the vicinity of the circumferential ends. Note that the cut parts 83 and 84 are preferably formed to have substantially the same size.

The tip ends of all the stator teeth are formed in the same shape to form the stator core 71. As the tip ends of the stator teeth have this shape, abrupt changes in the magnetic field at the stator teeth will be alleviated, so that the waveform of counter electromotive voltage will be more approximated to a sine waveform, and torque ripple and cogging torque will be reduced.

It is understood that when the shape and positioning of the stator teeth are the same as those of the stator teeth according to the Embodiment 2 described above, the same effects as those brought about by the Embodiment 2 will be provided.

As in the foregoing, according to Embodiment 3, the stator teeth forming the stator core are formed so that the rotor-opposing surface at the tip end of the stator tooth has a shape that is apart from the stator-opposing surface of the rotor near the circumferential ends at the tip end. In this way, abrupt changes in the magnetic field is alleviated, therefore a high torque will be generated, and the waveform of the generated voltage will be approximated to a sine waveform. Torque ripple and cogging torque are reduced, and distortions in the generated voltage are reduced. Consequently, the iron loss will be reduced, and a very efficient motor will be provided.

Embodiment 4

Figure 10A:
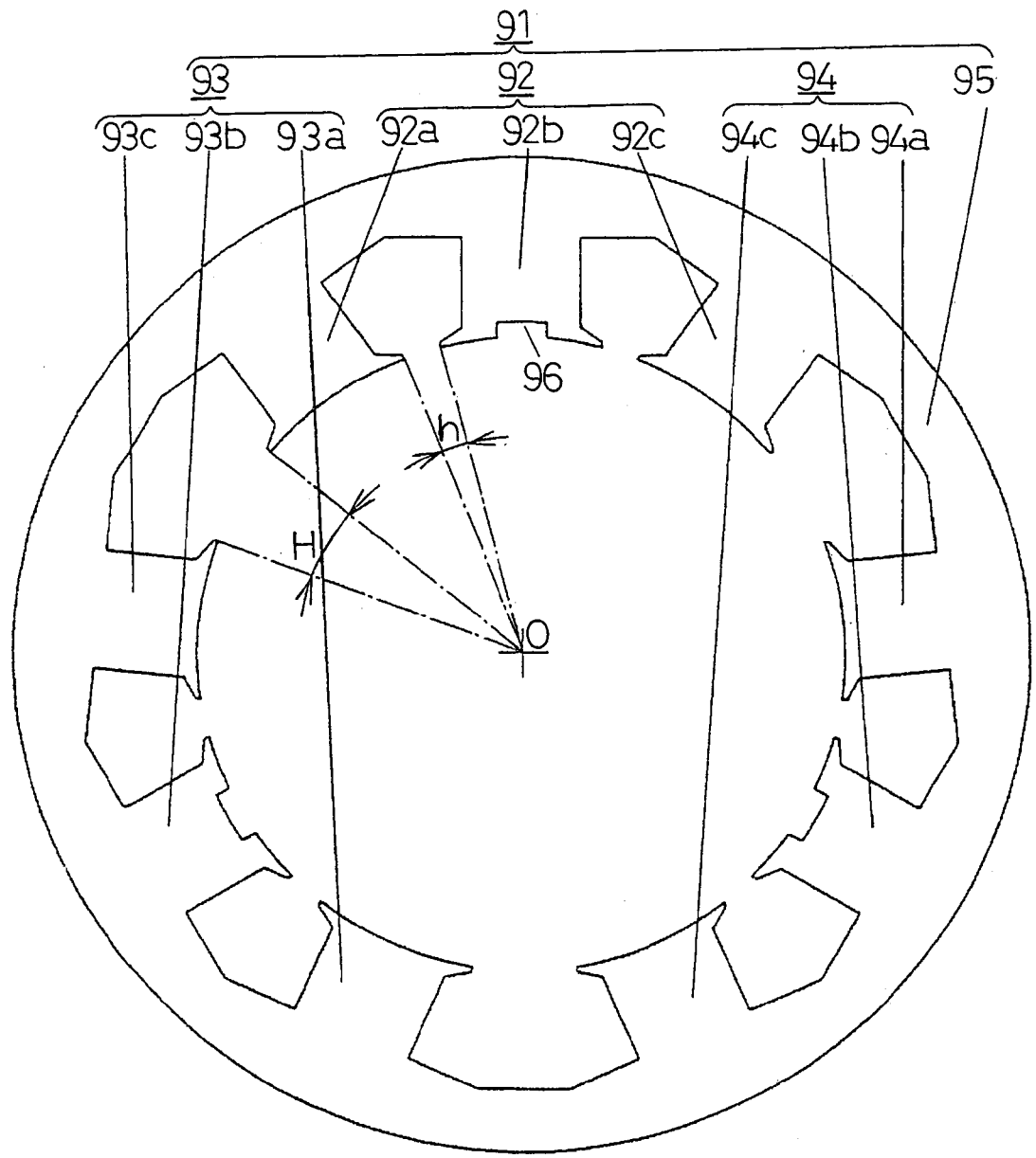
FIG. 10A is a schematic top view for use in illustration of a stator core according to Embodiment 4 of the present invention.

FIG. 10A is a schematic top view of a stator core for use in illustration of a motor according to Embodiment 4 of the present invention.

As shown in FIG. 10A, a stator core 91 includes stator teeth 92a, 92b, 92c, 93a, 93b, 93c, 94a, 94b, and 94c and a stator yoke 95 that connects the stator teeth 92a to 94c at one end. Similarly to the Embodiment 1 described above, the stator teeth 92a to 94c are divided into three groups 92, 93, and 94. The directions in which coils (not shown) are wound around adjacent stator teeth in the same group are opposite, and the relation between the angle h of a slot opening between adjacent stator teeth in the same group and the angle H of a slot opening formed between adjacent stator teeth belonging to different groups satisfies the foregoing expression (1). In addition, a permanent magnet-embedded rotor (not shown) opposes the rotor-opposing surfaces of the stator teeth 92a to 94c with a very small gap therebetween.

Here, the stator teeth in the group 92 will be detailed.

At the surface of the stator tooth 92b opposing the rotor (not shown) in the center of the group 92 at the tip on the opposite side to the stator yoke 95, a substantially rectangular recess 96 is formed so that the circumferential length of the rotor-opposing surface is approximately divided into three. The recess 96 formed at the stator tooth 92b apparently behaves as if it serves as the N pole when the stator tooth 92b is for example excited to the S pole by the coil (not shown) arranged around the stator tooth 92b. Therefore, the magnetic pole at the tip end of the stator tooth 92b is divided into parts with magnetic poles of S, N, and S in appearance by the recess 96. A recess identical to that provided in the stator tooth 92b is each formed in the stator teeth 93b and 94b in the center of the other groups 93 and 94, respectively, and the magnetic pole at the tip end is divided into parts with magnetic poles of S, N, and S in appearance. In this way, high torque is generated, and torque ripple is reduced to a small level.

Figure 10B:
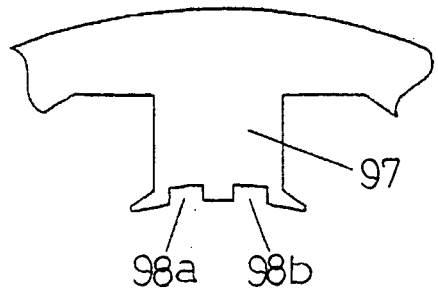
FIG. 10B is a partial view of another example of the recess according to the same embodiment.
Figure 10C:
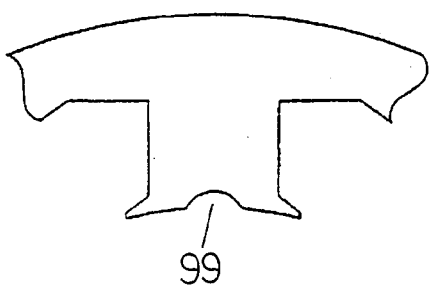
FIG. 10C is a partial view of the shape of yet another example of the recess according to the same embodiment.

Note that the number of recesses provided for each stator tooth is not necessarily one, and as shown in FIG. 10B, two recesses 98a and 98b are formed at the tip end of the stator tooth 97 or the number of the recesses may be three or more. The shape of the recess is not necessarily a rectangular shape. As shown in FIG. 10C, the recess is for example an arc recess 99 or a plurality of such arc recesses may be provided. It is understood that the same recess may be provided in the other stator teeth rather than the stator tooth in the center of each of the group.

It is understood that when the positioning of the stator teeth the same as that of the stator teeth according to the Embodiment 2 described above is employed or the shape of tip end the same as that according to the Embodiment 3 may be applied as the shape of the stator teeth according to the Embodiment 3, the same effects will be provided.

In the description of the Embodiments 1 to 4, the motor is an inner rotor type motor, in other words, the rotor is provided inside the stator, but the same effects will be provided if the motor is an outer rotor type motor, in other words, if the rotor is provided outside the stator.

As in the foregoing, according to Embodiment 4, a recess provided in each of the stator teeth in the center of the three groups allows a reluctance torque to be used in addition to the magnet torque similarly to the Embodiment 1, so that a high torque is generated, and torque ripple is reduced as well. Furthermore, distortions in the generated voltage are reduced, the iron loss is then reduced, and the permanent magnets are kept from being demagnetized. In this way, a very efficient motor will be provided.

Embodiment 5

Figure 11:
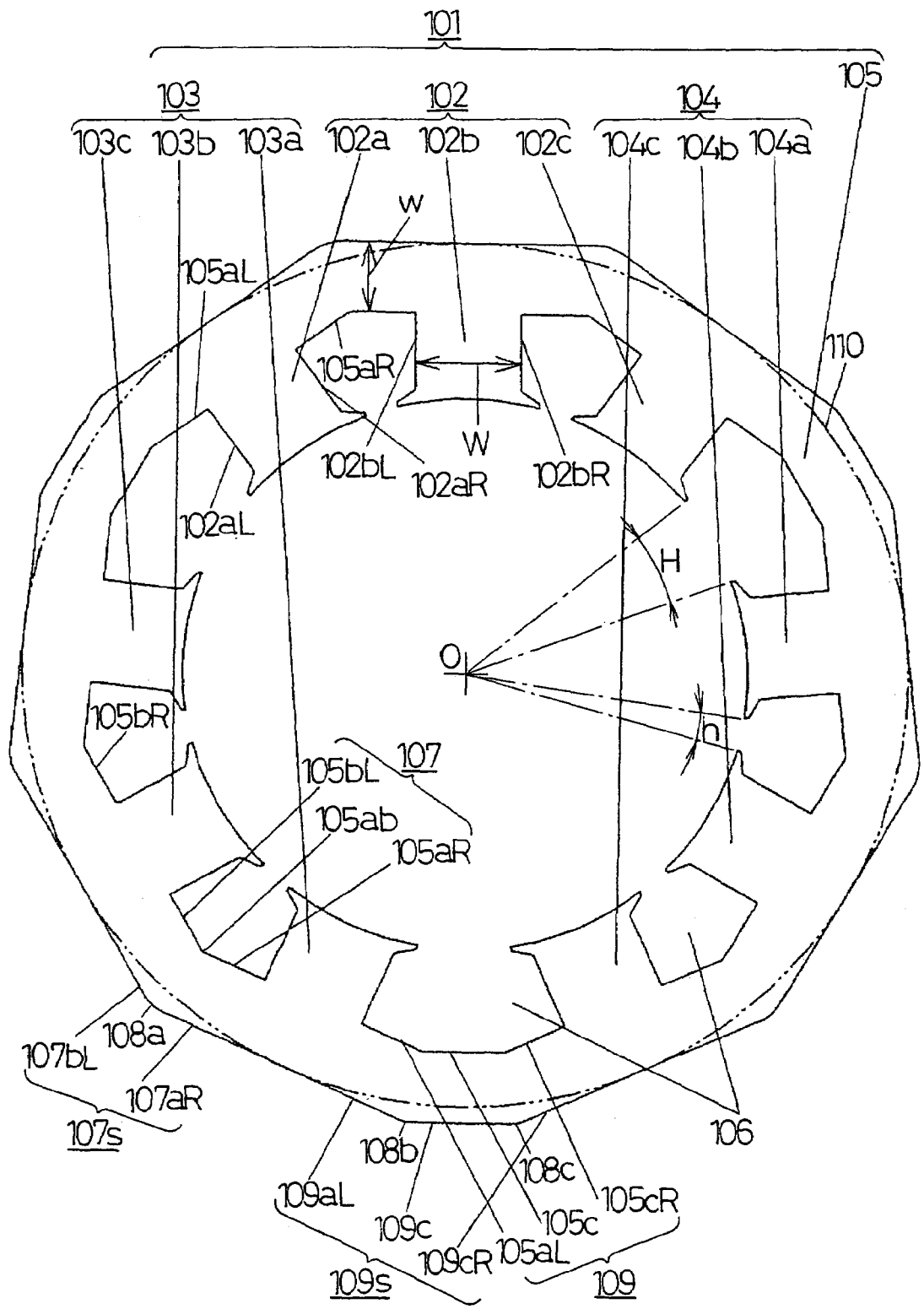
FIG. 11 is a schematic sectional view for use in illustration of a stator core according to Embodiment 5 of the present invention.

FIG. 11 is a schematic top view of a stator core for use in illustration of a motor according to Embodiment 5 of the present invention.

As shown in FIG. 11, a stator core 101 includes stator teeth 102a, 102b, 102c, 103a, 103b, 103c, 104a, 104b, and 104c, and a stator yoke 105 that connects these stator teeth 102a to 104c at one end. Similarly to the Embodiment 1 described above, the stator teeth 102a to 104c are divided into three groups 102, 103, and 104. A slot 106 as a space for arranging a coil (not shown) around is formed each between adjacent stator teeth among the stator teeth 102a to 104c. The side surfaces 102aL and 102aR of the parallel part of the stator tooth 102a and the side surfaces 105aL and 105aR of the stator yoke 105 coupled with the aforementioned surfaces are substantially at right angles so that the coil is wound around stator tooth 102a in a regular winding manner in order to maximize the number of turns in a coil for a slot space. The side surfaces of the parallel parts of the stator teeth 102b to 104c and the side surfaces of the stator yoke 105 on the rotor side are substantially at right angles similarly to the stator tooth 102a. The side surface 105aR and the side surface 105bL on the rotor side of the stator yoke 105 intersect at a intersection 105ab, have a flat, substantially V shape and together form a side surface 107 of the stator yoke 105 on the rotor side forming the slot 106. An outer side surface 107s opposing the side surface 107 of the stator yoke 105 on the rotor side is parallel to both the side surfaces 105aR and 105bL of the stator yoke 105 on the rotor side, and lines in contact with the outer circumference of a circle 110 centered on the center O of the rotor rotating shaft form side surfaces 107aR and 107bL. Note that in this case, an intersection 108a where the surfaces 107aR and 107bL in the side surface 107s parallel to the side surfaces 105aR and 105aL, respectively intersect each other is rounded in shape.

Meanwhile, the side surface 109 of the stator yoke 105 on the rotor side in the slot 106 between the adjacent stator teeth 103a and 104c belonging to the adjacent groups 103 and 104 is formed by side surfaces 105aL and 105cR having a length substantially equal to the length of the above described side surface 105aR and a side surface 105c connecting these side surfaces 105aL and 105cR. Here, the outer side surface 109s relative to the side surface 109 of the stator yoke 105 and positioned opposite to the slot 106 is formed by a side surface 109aL parallel to the side surface 105aL of the stator yoke 105 and in contact with the outer circumference of the circle 110 centered on the center O of the rotor rotating shaft, a side surface 109cR parallel to the side surface 105cR of the stator yoke 105 and in contact with the outer circumference of the circle 110 centered on the center O of the rotating shaft and a side surface 109c parallel to the side surface 105c. At the time, the distance between the side surfaces 105c and 109c is set to be the same as the distance between the side surfaces 105aL and 109aL (and also the same as the distance between the side surfaces 105cR and 109cR). In this way, the side surface 107aR in the above side surface portion 107s and the side surface 109aL in the side surface portion 109s are aligned. Note that the intersection 108b where the side surfaces 109aL and 108c intersect and the intersection 108c where the side surfaces 109cR and 109c intersect may be rounded in shape similarly to the intersection 108a.

The side surfaces of the stator yoke on the opposite side to the rotor opposing the slots formed between the stator teeth are formed similarly to the above described manner, and the width w of the stator yoke is substantially equal for the entire circumference. At the time, the relation between the width w of the stator yoke and the width W of the parallel part of the stator teeth is preferably in the range expressed as follows:

$$W \times \tfrac{1}{2} \leq w \leq W \times \tfrac{3}{2}$$

In addition, the side surface portions 107s and 109s of the stator yoke 105 on the opposite side to the rotor (not shown) side opposing the slot 106 protrude toward the opposite side (outer side in the radial direction) to the rotor side from the circle 110 centered on the center O of the rotating shaft inscribed on the side surfaces of the stator yoke 105 on the opposite side to the rotor side in the stator teeth 102a to 104c.

In this way, the side surfaces 107s and 109s of the stator yoke 105 on the opposite side to the rotor side protrude in the direction opposite to the rotor corresponding to the slots 106. The width w of the stator yoke is substantially equal for the entire circumference, so that the magnetic resistance will be well balanced, and a substantially homogeneous magnetic flux will be generated. Consequently, a stable and efficient magnetic field will be provided.

Using the above-described stator core 101, a plurality of stator teeth 102a to 104c forming the stator core 101 are divided into three groups, and the coils (not shown) are wound in the opposite directions around adjacent stator teeth belonging to the same group. The relation between the angle h of a slot opening between adjacent stator teeth in the same group and the angle H of a slot opening formed between adjacent stator teeth belonging to different groups satisfies the foregoing expression (1). In addition, a permanent magnet-embedded rotor (not shown) is opposed against the inner circumferential surfaces of the stator teeth 102a to 104c with a very small gap therebetween similarly to the Embodiment 1 as described above.

It is understood that the shape and positioning of the stator teeth in the stator cores according to the Embodiments 2 to 4 as described above may be applied.

It is also noted that the configurations of the stators and rotors in the Embodiments 1 to 5 described above allow voltage having a substantially sine waveform to be generated when the rotor is driven to rotate as is well known, so that an efficient generator is provided.

As in the foregoing, according to Embodiment 5, the plurality of stator teeth 102a to 104c and the stator yoke 105 whose width is substantially equal form the stator core 101, so that the magnetic resistance is well balanced, a substantially homogeneous magnetic flux will be generated, and a stable and efficient magnetic field will be provided. Similarly to the Embodiment 1 described above, a high torque is generated and distortions in the generated voltage are reduced to reduce the iron loss, which prevents the permanent magnets from being demagnetized. Therefore, a very efficient motor will be provided.

Embodiment 6

Now, Embodiment 6 will be described.

Figure 12:
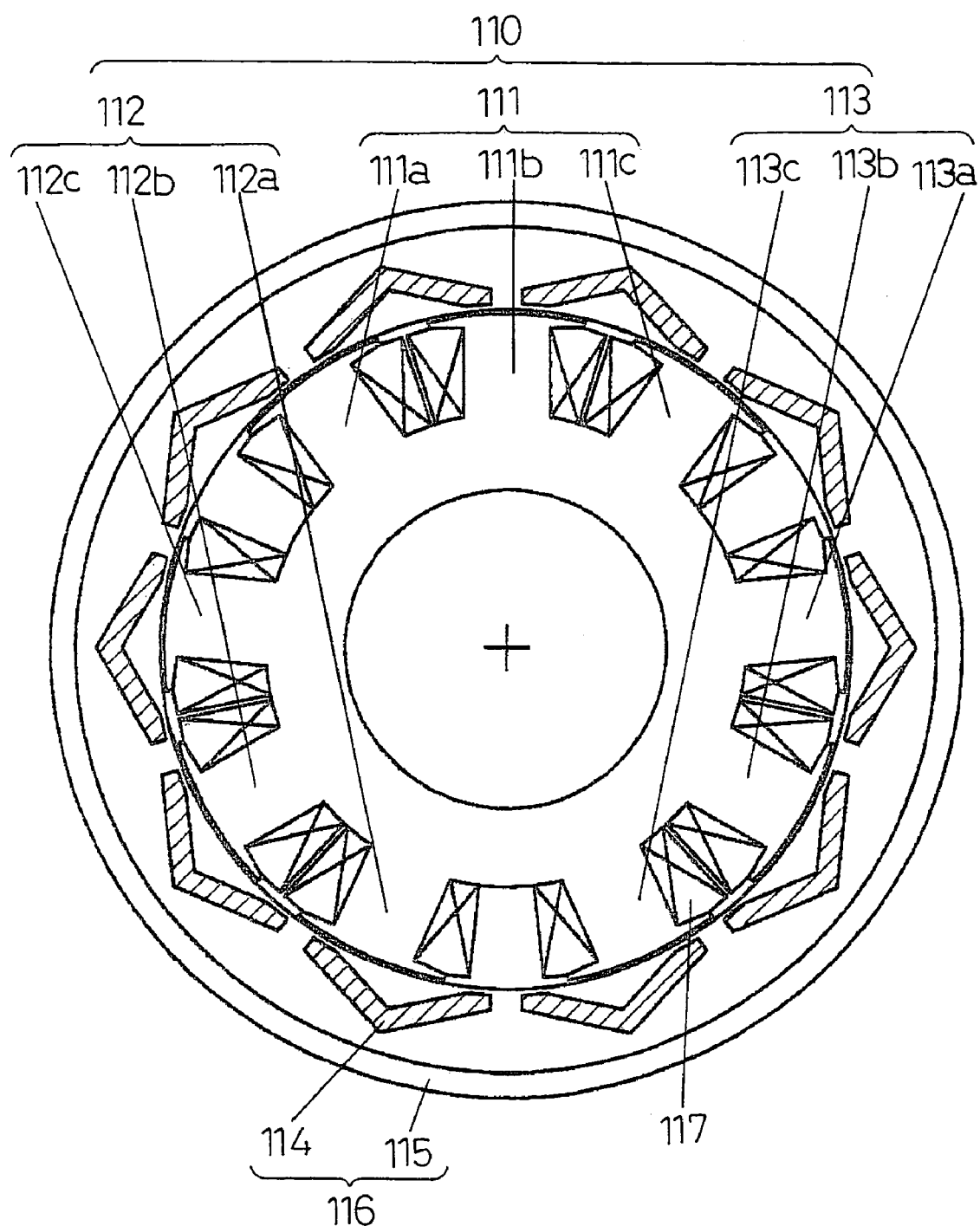
FIG. 12 is a schematic sectional view for use in illustration of a main part of a motor according to Embodiment 6 of the present invention.

The motor according to the above described embodiments of the present invention are inner rotor type motors for the ease of illustration, while with an outer rotor type motor, the same effects are brought about. An outer rotor type motor according to this embodiment is shown in FIG. 12. The positional relation between the rotor and stator is reversed and the other configuration is basically the same. The outer rotor type motor cannot be formed into a large size machine, but the opening of the stator around which a coil is arranged faces outwardly and therefore winding the coils around becomes easier, which is suitable for mass production.

FIG. 12 shows a stator 110 and groups 111, 112, and 113 each having a plurality of stator teeth with coils wound around and supplied with voltage in the same phase, outer rotor type magnets 114, a fixed frame 115 for the magnets, and a rotor 116 including the magnets 114 and the fixed frame 115. The frame 115 typically serves as a magnet yoke. The groups of stator teeth 111a, 111b, and 111c, 112a, 112b, and 112c, and 113a, 113b, and 113c correspond to the above three groups, i.e., the U, V, and W phases, respectively. Here, the stator 110 is coupled to a plate for fixation with the outside, and the rotor 116 is rotatably coupled to the stator 110 through a shaft and a bearing. The numeral 117 represents a stator coil.

It is understood that in connection with FIG. 12, a magnet embedded type configuration, in other words, an IPM motor is described as an example of an inner rotor type motor, but a surface magnet type motor, in other words, an SPM motor may similarly be applied.

Embodiment 7

Now, Embodiment 7 of the present invention will be described.

In the above description, the motor is a brushless type motor by way of illustration, but a brush commutator motor may similarly be applied, and the same effects as those by the above-described embodiments are brought about. The present embodiment is exactly the case. The brush commutator motor has a similar configuration as that of an outer rotor brushless motor, and typically includes magnets on the outer side and a stator having coils on the inner side. However, unlike the outer rotor brushless motor, according to the present embodiment, the rotating part is on the coil side positioned on the inner side, and therefore a mechanism to feed the coil through the brush commutator is necessary. An example of an SPM brush commutator motor having the above-described configuration is shown in FIG. 13.

Figure 13:
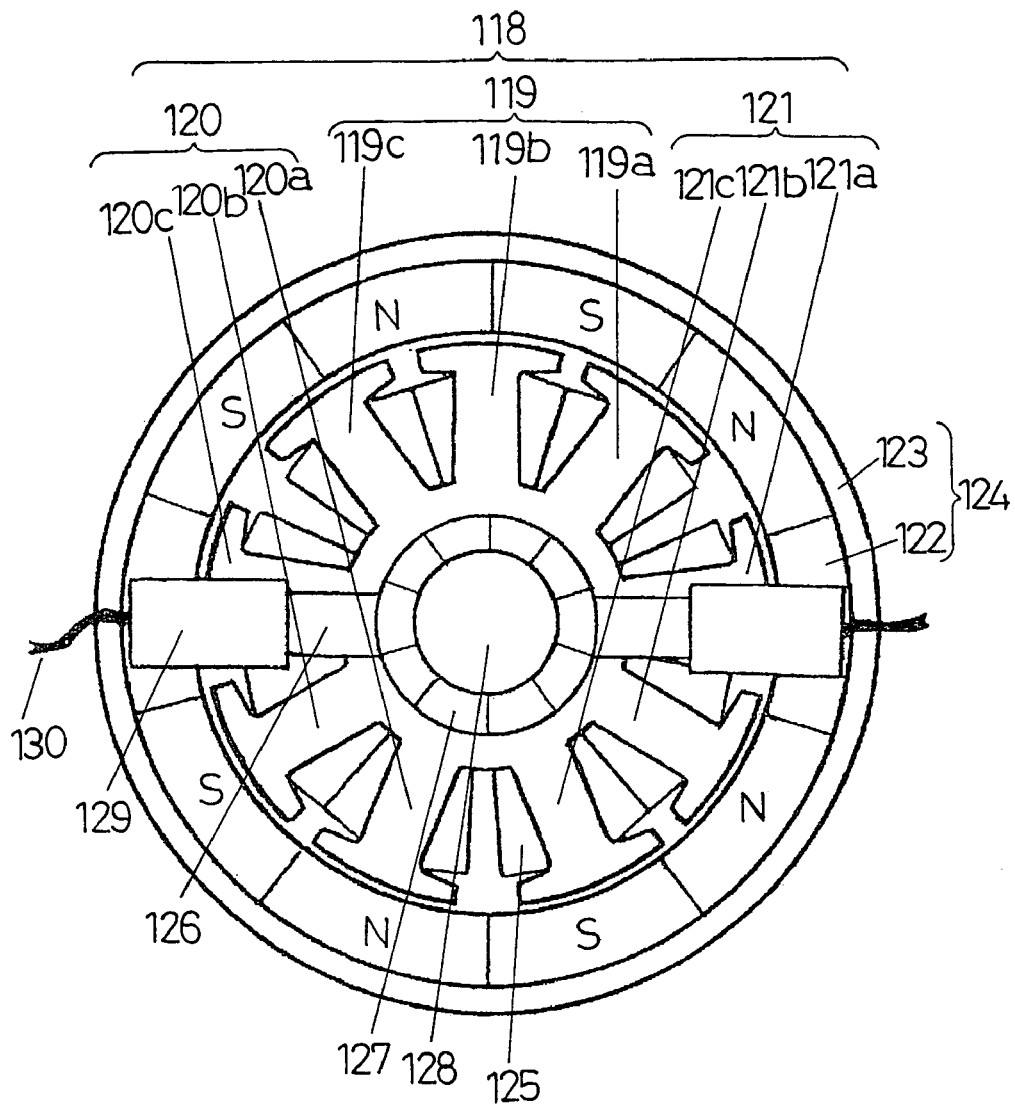
FIG. 13 is a schematic sectional view for use in illustration of a main part of a motor according to Embodiment 7 of the present invention.

FIG. 13 shows a rotor 118, groups 119, 120, and 121 each having a plurality of stator teeth with coils wound around and supplied with voltage in phase, magnets 122, a fixed frame 123 for the magnets, and a stator 124 including the magnets 122 and the frame 123. The frame 124 typically serves as a magnet yoke. The groups of stator teeth 118a, 118b, and 118c, 119a, 119b, and 119c, and 120a, 120b, and 120c correspond to the above three groups, i.e., the U, V, and W phases, respectively. There are a feeding brush 126, a commutator 127, a rotating shaft 128, a brush retainer 129, and a feeding line 130. The stator 124 is coupled with a plate (not shown) for fixation with the outside, and the rotor 118 is rotatably coupled to the stator 124 through the rotating shaft 128 and a bearing (not shown).

Embodiment 8

Now, Embodiment 8 of the present invention will be described.

The use of aluminum or an aluminum alloy for coils to reduce the weight of a motor is generally practiced. When a copper coil for a motor is to be changed to an aluminum coil in general, the stator rotor part must be larger in size than the copper wire motor about by 26% so that the motor temperature rise is unchanged, because the resistance value of the aluminum coil is about 1.6 times as large as that of the copper coil. The motor according to the present invention is designed to have a torque per volume about twice as high as a typical motor, and therefore even using an aluminum or aluminum alloy coil, the motor will be smaller in size than other motors with copper coils. Therefore, the volume, the weight, and the cost will be reduced.

An aluminum or aluminum alloy coil has poor solderability. Therefore, in order to compensate for the disadvantage, according to the present embodiment, an aluminum or aluminum alloy coil is coated with a metal free from copper and having good solderability such as iron, nickel, zinc, tin, and silver, a combination of at least two of these metals, or an alloy containing or any of these metals as a main component.

Figure 14:
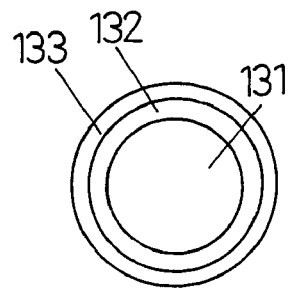
FIG. 14 is a schematic sectional view of an aluminum coil according to Embodiment 8 of the present invention.

FIG. 14 shows a section of the aluminum or aluminum alloy coil. The figure shows an aluminum or aluminum alloy coil 131 that is a main part of the motor coil, a metal 132 such as iron, nickel, zinc, tin, and silver, a combination of at least two of these metals, or an alloy containing any of these metals as a main component, and an insulating coating film 133.

Figure 15A:
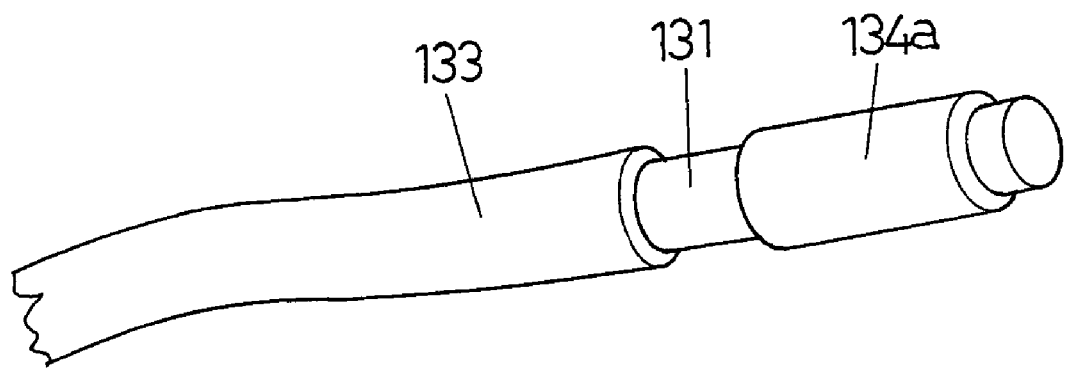
FIG. 15A is a schematic view of an end of the aluminum coil according to the Embodiment 8 of the present invention.
Figure 15B:
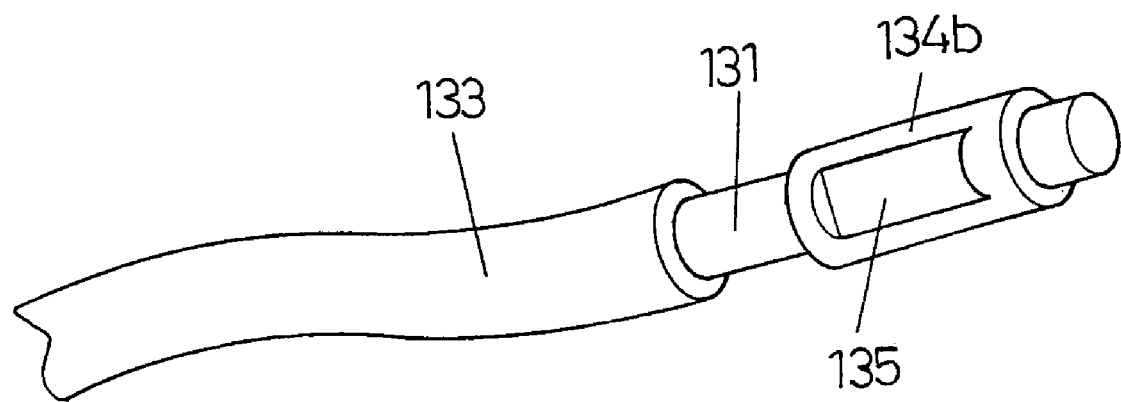
FIG. 15B is a schematic view of another example of the aluminum coil end according to the same embodiment.

The above described metal or alloy may cover only the end part of the aluminum or aluminum alloy wire when the wire is wound around for the motor. The metal or alloy may be fixed to the aluminum or aluminum alloy wire before or after winding by shrink-fit or caulking. The metal or alloy having an arc or polygonal section may be disconnected in the axial direction. The metal covering the aluminum or aluminum alloy wire needs only cover the coil coupling end as it suits the purpose, and therefore the metal or alloy may be shrink-fit or caulked for fixing to the end when coils are wound around for the motor. An example of this will be described in conjunction with FIGS. 15A and 15B. FIGS. 15A and 15B show a metal ring 134a fixed by shrink-fit, a metal ring 134b fixed by caulking, and its caulked part 135. Note that the metal member does not have to be in such a continuous ring shape, and the same effect will be provided if there is a disconnection in the ring partly or entirely in the axial direction.

Embodiment 9

Now, Embodiment 9 of the present invention will be described.

Most brushless motors store a circuit board for a driving circuit. Therefore, according to Embodiment 9, a metal other than typical copper and having good solderability as described in conjunction with the above embodiment is used for the metal for interconnection for the circuit board. In this way, a circuit board built-in brushless motor having a smaller size than the other configuration and completely free from copper will be provided. When a brush commutator motor is used, the use of a motor completely free from a copper component typically included in a brush commutator completely removes the motor of copper. As for a motor having a connector, the use of a metal completely free from copper allows a completely copper-free motor to be provided.

Embodiment 10

Now, Embodiment 10 of the present invention will be described.

Some motors have a lead wire and the lead wire must be made of an aluminum or aluminum alloy wire in order to provide a completely copper-free motor. In this case, an aluminum or aluminum alloy wire having its surface coated with a metal having good solderability or a metal free from copper and having good solderability is attached to the ends by caulking or shrink fit. Similarly to the above-described embodiments, the metal member needs only have a cylindrical or polygonal section, and may be disconnected in the axial direction.

Figure 16A:
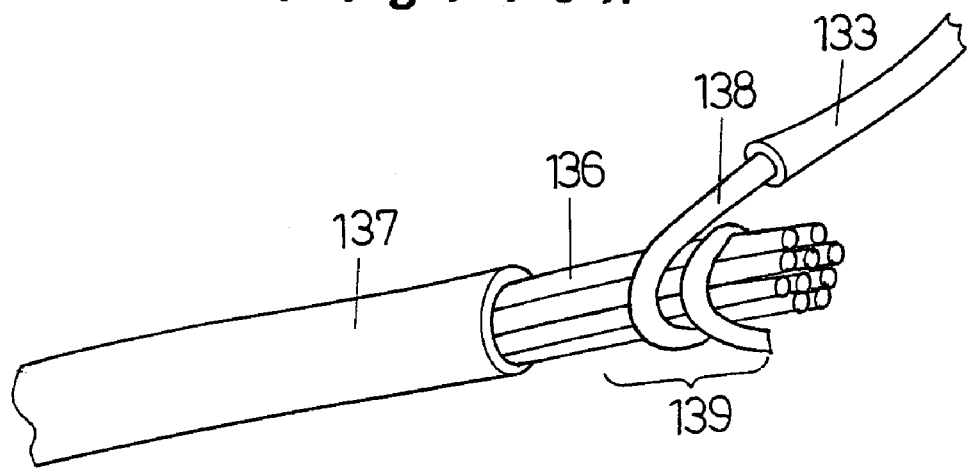
FIG. 16A is a schematic view showing how lead wires and aluminum coils according to Embodiment 10 of the present invention are connected.
Figure 16B:
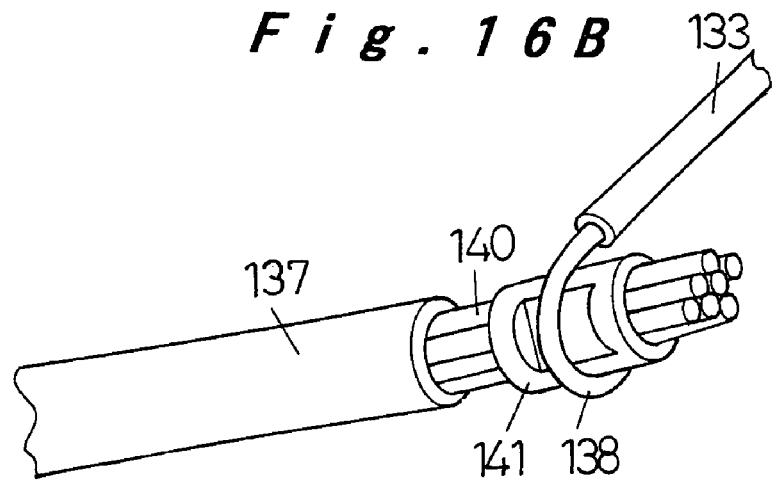
FIG. 16B is a schematic view of another example of how lead wires and aluminum coils according to the same embodiment are connected.
Figure 16C:
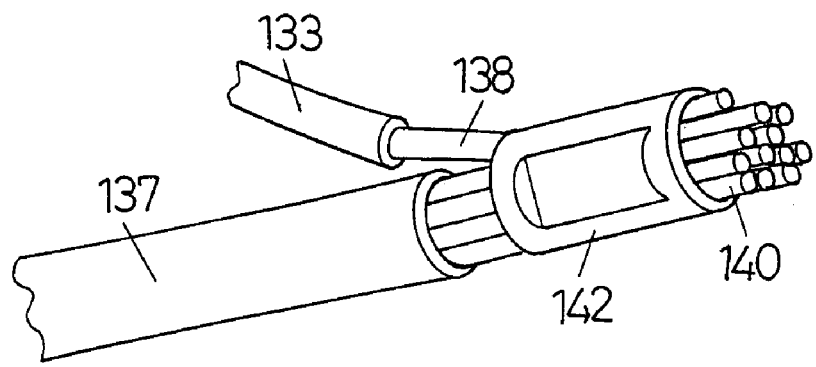
FIG. 16C is a schematic view of yet another example of how lead wires and aluminum coils according to the same embodiment are connected.
Figure 17:
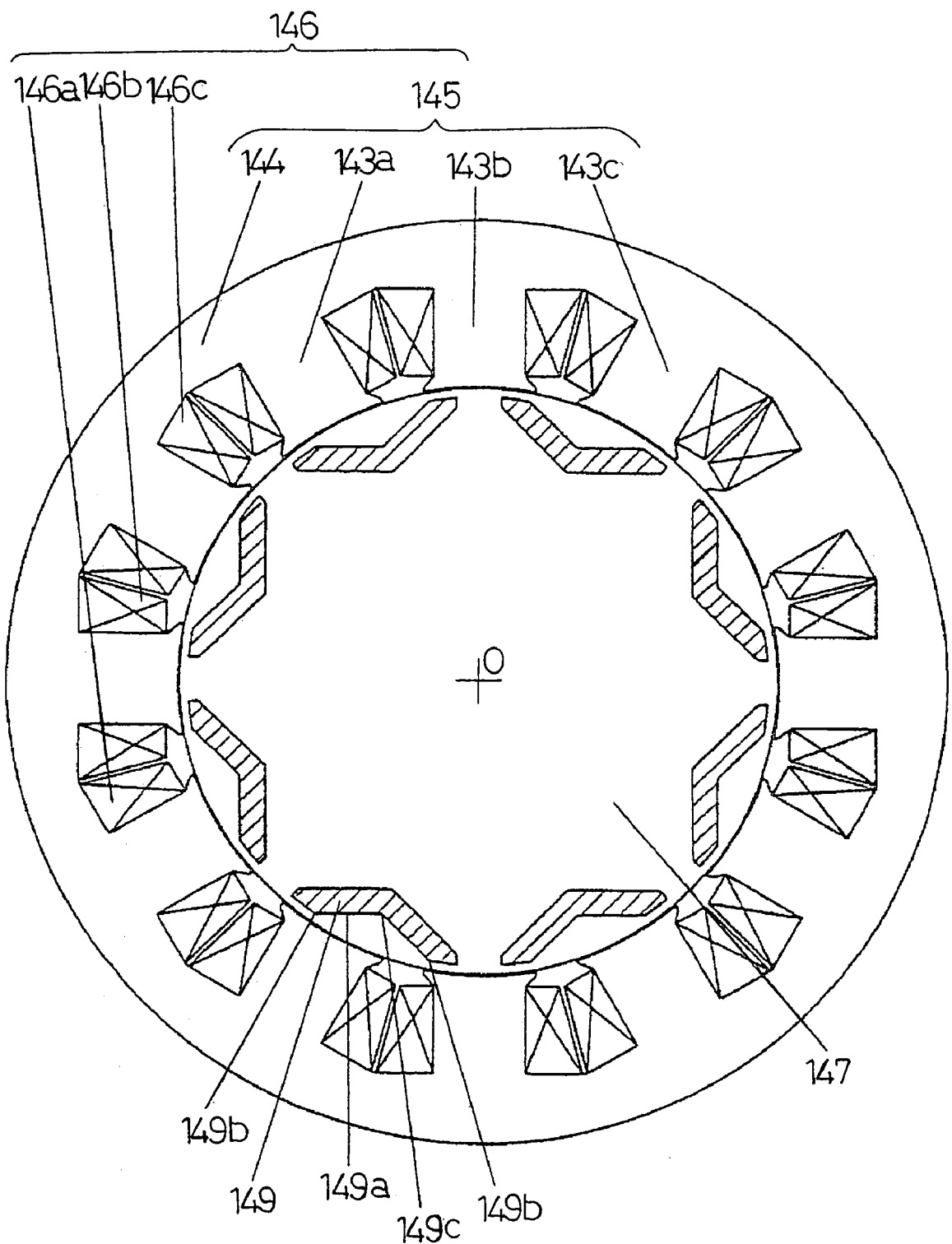
FIG. 17 is a schematic sectional view of a main part of a conventional motor.

FIGS. 16A to 16C show aluminum or aluminum alloy wires 136 coated with a metal as described above that are used as a lead wire for feeding the motor. Here, 137 is an insulating coating, and 138 is an aluminum wire coated with 132 or 134a, and 134b and soldered at a winding solder portion 139. The numeral 140 indicates a core of the aluminum or aluminum alloy lead wire, 141 is a metal ring with good solderability fixed to the core wires 140 by caulking or shrink fit, and 142 is a caulking ring for fixing the core wires 140 of the aluminum or aluminum alloy wires and the coil 138.

Note that in the foregoing, the aluminum or aluminum alloy wire is described by way of illustration, but a metal or an alloy other than aluminum may be employed as long as a copper wire is not used.

As in the foregoing, the Embodiments 1 to 10 are described. Note that the motor generator according to the Embodiments 1 to 10 are also useful as a motor for driving a vehicle such as PEV (Pure Electric Vehicle), HEV (Hybrid Electric Vehicle), and FCEV (Fuel Cell Electric Vehicle), so that there is no necessity for providing two kinds of motor generators for a high pressure system and a low pressure system or for separately providing a DC—DC converter as would otherwise be done according to the conventional technique. Therefore, an electric vehicle driving system with a reduced space will be provided at a reduced cost, so that an electric vehicle whose compartment is spacious will be provided less costly. This also applies when the motor is used as a motor provided in a home electrical appliance or a robot for driving the appliance or robot, and the same effect will be brought about.

INDUSTRIAL APPLICABILITY

As in the foregoing, according to the present invention, a high torque is generated for a permanent magnet-embedded type, concentrated winding motor, and since coils for adjacent stator teeth in each group of stator teeth have different polarities from each other, the magnetic field distribution deviations and distortions in voltage generated between terminals at the time of driving the motor are reduced. Eddy current is reduced so that the iron loss is reduced. Since heat generation by eddy current at the permanent magnets is reduced, the demagnetization of the permanent magnets is also reduced. Consequently, a highly efficient motor is provided.

In addition, the motor is free from a copper wire for motor coils, has a motor volume smaller than a typical copper wire motor and reduced distortions in inductive voltage waveform. Therefore, a motor advantageous in terms of resource conservation is provided, and the motor is useful for reducing copper wires for an engine built-in motor for a hybrid vehicle, a main power motor for an electric vehicle, and various other motors for a vehicle such as a motor for air conditioning.

What is claimed is:

1. A motor, comprising:
    a stator including a stator core having a plurality of stator teeth, and a stator yoke that connects the plurality of stator teeth, and coils wound around the plurality of stator teeth; and
    a rotor including a rotor core, and a plurality of permanent magnets embedded in said rotor core, wherein the plurality of adjacent stator teeth around which the coils are wound around are provided in groups, said coils being provided with in phase voltage,
    the coils being wound in opposite directions around the plurality of adjacent stator teeth in the same group, and voltages in different phases being applied to adjacent groups of stator teeth,
    wherein slot openings are provided between each of the adjacent stator teeth, the slot openings between adjacent teeth of the same group having a different spacing than slot openings between adjacent teeth of different groups.

2. The motor according to claim 1, wherein there are 3s groups where s is a positive integer, and each said group includes n stator teeth where n is a positive integer.

3. The motor according to claim 2, wherein when the number of poles of said rotor is p, the total number of said stator teeth is t, and the number of sets of coils is s when coils in three phases, U, V, and W phases are set as one set where p, t, and s are each a positive integer, the relation represented by the following expression is satisfied:

$$p=2\times(s(\pm 1+3k)) \text{ and } p>t$$

where k is a positive integer.

4. The motor according to claim 3, wherein the relation between an angle h of the slot opening formed between adjacent stator teeth in the same group and an angle H of the slot opening formed between adjacent stator teeth belonging to different groups is represented by the following expression:

$$h<H\leq 3h.$$

5. The motor according to claim 1, wherein a central line passing through each of the circumferential centers of the tip ends of stator teeth in each group positioned at both ends of said group adjacent to the stator teeth belonging to different groups is deviated in the circumferential direction from a central line passing through each of the circumferential centers of parallel parts of the stator teeth positioned at both ends in said group.

6. The motor according to claim 5, wherein the circumferential ends at the tips of stator teeth positioned at both ends in each said group are not positioned inward, in the width-wise direction of the parallel parts of stator teeth positioned at both ends in said group.

7. The motor according to claim 1, wherein at said plurality of stator teeth that form the stator core, in the vicinity of the circumferential end of the tip end of the stator tooth that opposes the stator opposing surface of the rotor, cut parts are provided spaced from the stator opposing surface of the rotor.

8. The motor according to claim 1, wherein the tip end of one or more of the plurality of stator teeth forming said group on the side of said rotor is provided with one or more recesses.

9. The motor according to claim 8, wherein said recess is one of a rectangular shape and an arc shape.

10. The motor according to claim 1, wherein a side surface of said stator yoke on the side opposite to the rotor side in said stator protrudes more onto the side opposite to the rotor side beyond a circle having a radius extending from the center of the rotating shaft of the motor to a side surface of each of said plurality of stator teeth on the side opposite to the rotor side, and a width w of the stator yoke coupling said plurality of stator teeth is equal for the entire circumference of said stator core.

11. The motor according to claim 10, wherein the relation between the width w of said stator yoke and a width W of the parallel part of said stator tooth around which a coil is wound is represented by the following expression:

$$W \times \tfrac{1}{2} \leq w \leq W \times \tfrac{3}{2}.$$

12. The motor according to claim 1, wherein said rotor is a surface magnet type rotor.

13. The motor according to claim 1, wherein said rotor is a magnet-embedded type rotor.

14. The motor according to claim 1, wherein the rotor core includes a plurality of slits having substantially the same shape as that of the plurality of permanent magnets provided in said rotor on the opposite side to the stator side of said plurality of permanent magnets, and a width of said slits are smaller than the thickness of said permanent magnets.

15. The motor according to claim 1, wherein in said rotor comprising said plurality of permanent magnets, a distance between the stator side surface of each of said plurality of permanent magnets and a stator opposing surface of said rotor is larger toward the central part than at the ends of each of the permanent magnets.

16. The motor according to claim 15, wherein said plurality of permanent magnets forming said rotor are in a substantially V shape that protrudes in a direction opposite to the side of the stator opposing surface of said rotor.

17. The motor according to claim 15, wherein said plurality of permanent magnets forming said rotor are in a linear shape arranged perpendicularly to the radial direction of said rotor.

18. The motor according to claim 15, wherein said plurality of permanent magnets forming said rotor are in an arc shape that protrudes in a direction opposite to the side of the stator opposing surface of said rotor.

19. The motor according to claim 15, wherein said plurality of permanent magnets forming said rotor are in an arc shape that protrudes to the side of the stator opposing surface of said rotor and has a larger radius than the radius of said rotor core forming said rotor.

20. The motor according to claim 3, wherein each said group includes three stator teeth, and the total number of the stator teeth is 9s, and the number of rotor poles p is 10s.

21. The motor according to claim 1, wherein said rotor is in an outer rotor structure.

22. The motor according to claim 1, wherein said rotor is provided with an armature coil, and
said armature coil is fed through a brush and a commutator.

23. The motor according to claim 1, wherein aluminum wire or aluminum alloy wire-is used as an armature coil.

24. The motor according to claim 1, wherein aluminum wire or aluminum alloy wire having a surface coated with a metal or alloy with solderability is used as an armature coil.

25. The motor according to claim 1, wherein aluminum wire or aluminum alloy wire having an end surface coated with a metal or alloy with solderability is used as an armature coil.

26. The motor according to claim 25, wherein in the aluminum wire or aluminum alloy wire having the end surface coated with said metal or alloy with solderability, said metal or alloy with solderability is fixed by caulking or shrink fit.

27. The motor according to claim 1, further comprising a built-in circuit board, wherein any one of iron, nickel, zinc, tin, silver, a combination of two or more of these metals, and an alloy containing any of these metals as a main component is used for an interconnection pattern for said circuit board.

28. The motor according to claim 22, wherein any one of iron, nickel, zinc, tin, silver, a combination of two or more of these metals, an alloy containing any of these metals as a main component, a mixture of any of these metals and carbon, and carbon is used for the brush or the commutator.

29. The motor according to claim 1, further comprising a connector made with any one of iron, nickel, zinc, tin, silver, a combination of two or more of these metals, and an alloy containing any of these metals as a main component.

30. The motor according to claim 1, wherein aluminum wire or aluminum alloy wire having an end coated with a metal or alloy with solderability is used as a feeding lead wire.

31. The motor according to claim 1, wherein aluminum wire or aluminum alloy wire having a metal or alloy with solderability fixed to an end by caulking or shrink fit is used as a feeding lead wire.

32. The motor according to claim 24, wherein said metal or alloy with solderability is any one of iron, nickel, zinc, tin, silver, a combination of two or more of these metals, and an alloy containing any of these metals as a main component.

33. A vehicle comprising the motor according to claim 1 as a vehicle driving motor.

34. A hybrid vehicle comprising the motor according to claim 1 as a vehicle driving motor.

35. An electric vehicle comprising the motor according to claim 1 as a vehicle driving motor.

36. A fuel cell electric vehicle comprising the motor according to claim 1 as a vehicle driving motor.

37. A home electrical appliance comprising the motor according to claim 1 as a driving motor for the appliance.

38. A robot comprising the motor according to claim 1 as a driving motor.

39. The motor according to claim 25, wherein said metal or alloy with solderability is any one of iron, nickel, zinc, tin, silver, a combination of two or more of these metals, and an alloy containing any of these metals as a main component.

40. The motor according to claim 26, wherein said metal or alloy with solderability is any one of iron, nickel, zinc, tin, silver, a combination of two or more of these metals, and an alloy containing any of these metals as a main component.

41. The motor according to claim 30, wherein said metal or alloy with solderability is any one of iron, nickel, zinc, tin, silver, a combination of two or more of these metals, and an alloy containing any of these metals as a main component.

42. The motor according to claim 31, wherein said metal or alloy with solderability is any one of iron, nickel, zinc, tin, silver, a combination of two or more of these metals, and an alloy containing any of these metals as a main component.

* * * * *